(12) United States Patent
Flaster

(10) Patent No.: US 11,255,324 B2
(45) Date of Patent: Feb. 22, 2022

(54) REMOTELY CONTROLLED INTEGRATED PORTABLE BATTERY-POWERED VARIABLE-PRESSURE ELECTRIC PUMP AND POWER EMERGENCY STATION

(71) Applicant: FFP2018, Inc., La Jolla, CA (US)

(72) Inventor: Michael Leonard Flaster, La Jolla, CA (US)

(73) Assignee: FFP2018, Inc., La Jolla, CA (US)

(*) Notice: Subject to any disclaimer, the term of this patent is extended or adjusted under 35 U.S.C. 154(b) by 2 days.

(21) Appl. No.: 17/021,342

(22) Filed: Sep. 15, 2020

(65) Prior Publication Data

US 2020/0408204 A1 Dec. 31, 2020

Related U.S. Application Data

(63) Continuation-in-part of application No. 16/683,806, filed on Nov. 14, 2019, which is a continuation-in-part of application No. 16/552,957, filed on Aug. 27, 2019, now Pat. No. 10,722,740, which is a continuation-in-part of application No. 16/539,959, filed on Aug. 13, 2019, now Pat. No. 10,716,963, which is a continuation-in-part of application No. 16/259,883, filed on Jan. 28, 2019, now Pat. No. 10,393,126.

(60) Provisional application No. 62/625,616, filed on Feb. 2, 2018.

(51) Int. Cl.
| | |
|---|---|
| *F04B 49/06* | (2006.01) |
| *F04B 17/03* | (2006.01) |
| *H02J 9/04* | (2006.01) |
| *G08B 25/10* | (2006.01) |
| *G05B 15/02* | (2006.01) |

(52) U.S. Cl.
CPC ............ *F04B 49/065* (2013.01); *F04B 17/03* (2013.01); *G05B 15/02* (2013.01); *G08B 25/10* (2013.01); *H02J 9/04* (2013.01)

(58) Field of Classification Search
CPC ........ F04B 49/065; F04B 17/03; F04B 17/06; G05B 15/02; G08B 25/10; H02J 9/04; H02J 9/06; A62C 3/02; A62C 25/00
See application file for complete search history.

(56) References Cited

U.S. PATENT DOCUMENTS

| | | |
|---|---|---|
| 4,488,603 A | 12/1984 | Schmittmann et al. |
| 4,863,593 A | 9/1989 | Quick |
| (Continued) | | |

FOREIGN PATENT DOCUMENTS

| | | |
|---|---|---|
| CN | 204936845 | 1/2016 |
| JP | 2017204908 A | 11/2017 |

OTHER PUBLICATIONS

Supplementary European Search Report, European Patent Application No. EP19746605, dated Sep. 27, 2021.

*Primary Examiner* — Ramesh B Patel
(74) *Attorney, Agent, or Firm* — Procopio Cory Hargreaves and Savitch LLP

(57) ABSTRACT

An integrated, portable, battery-powered, variable-pressure electric liquid pump and power emergency station including a remote wireless communication unit located remotely from and in wireless communication with the emergency station to improve wireless reception in the integrated, portable, battery-powered, variable-pressure electric liquid pump and power emergency station.

8 Claims, 20 Drawing Sheets

(56) References Cited

U.S. PATENT DOCUMENTS

| | | | | |
|---|---|---|---|---|
| 5,295,890 A * | 3/1994 | Myers | | A63H 17/006 |
| | | | | 446/176 |
| 6,279,838 B1 | 8/2001 | Sivells et al. | | |
| 7,134,088 B2 * | 11/2006 | Larsen | | G09B 9/003 |
| | | | | 715/765 |
| 7,878,258 B2 | 2/2011 | Lindstrom et al. | | |
| 7,909,112 B2 | 3/2011 | Decker | | |
| 9,000,921 B2 * | 4/2015 | Jordan, II | | G05F 1/10 |
| | | | | 340/568.3 |
| 9,278,237 B2 | 3/2016 | Cook | | |
| 9,433,811 B1 | 9/2016 | Mohammad | | |
| 9,623,922 B2 | 4/2017 | Niedzwiecki | | |
| 9,878,341 B2 | 1/2018 | Gilpatrick | | |
| 10,389,121 B1 * | 8/2019 | Sherry | | H02S 10/12 |
| 10,393,126 B1 * | 8/2019 | Flaster | | H02J 9/061 |
| 10,405,148 B2 * | 9/2019 | Lee | | H04W 4/06 |
| 10,716,963 B2 * | 7/2020 | Flaster | | F04B 49/065 |
| 10,722,740 B2 * | 7/2020 | Flaster | | A62C 3/0292 |
| 2002/0114983 A1 * | 8/2002 | Frank | | H01M 16/006 |
| | | | | 429/9 |
| 2003/0158635 A1 * | 8/2003 | Pillar | | B60R 16/0315 |
| | | | | 701/1 |
| 2005/0006109 A1 * | 1/2005 | McSheffrey | | G08B 19/00 |
| | | | | 169/75 |
| 2005/0040254 A1 | 2/2005 | Chang | | |
| 2005/0077391 A1 | 4/2005 | Powell et al. | | |
| 2006/0180321 A1 * | 8/2006 | Yoshida | | F04B 49/02 |
| | | | | 169/13 |
| 2007/0008104 A1 * | 1/2007 | McBain | | G08B 23/00 |
| | | | | 340/517 |
| 2007/0296575 A1 * | 12/2007 | Eisold | | G08B 27/008 |
| | | | | 340/539.16 |
| 2008/0061166 A1 * | 3/2008 | Jacques | | B05B 7/0037 |
| | | | | 239/373 |
| 2008/0150473 A1 | 6/2008 | Wise | | |
| 2008/0257566 A1 | 10/2008 | Shattuck | | |
| 2009/0051131 A1 * | 2/2009 | Warrington | | A63B 21/06 |
| | | | | 280/19 |
| 2009/0169321 A1 * | 7/2009 | Flannigan | | B61D 45/001 |
| | | | | 410/101 |
| 2009/0269217 A1 * | 10/2009 | Vijayakumar | | F04D 29/605 |
| | | | | 417/234 |
| 2009/0284022 A1 * | 11/2009 | Usselman | | F02D 29/06 |
| | | | | 290/38 R |
| 2009/0294139 A1 | 12/2009 | Wilson | | |
| 2010/0122824 A1 | 5/2010 | Aamodt | | |
| 2011/0232925 A1 * | 9/2011 | Al-Azemi | | A62C 27/00 |
| | | | | 169/52 |
| 2011/0266009 A1 | 11/2011 | Liu | | |
| 2012/0067598 A1 | 3/2012 | Cordani | | |
| 2012/0274077 A1 * | 11/2012 | Usselman | | F02N 11/0862 |
| | | | | 290/1 A |
| 2014/0199180 A1 * | 7/2014 | Schoendorff | | F04B 51/00 |
| | | | | 417/53 |
| 2015/0231430 A1 | 8/2015 | Cook | | |
| 2016/0211931 A1 * | 7/2016 | Takahashi | | H04W 4/90 |
| 2017/0022992 A1 | 1/2017 | Jutras | | |
| 2017/0149303 A1 | 5/2017 | Urch | | |
| 2017/0165692 A1 | 6/2017 | Thompson et al. | | |
| 2017/0170979 A1 * | 6/2017 | Khalid | | H04L 12/2818 |
| 2017/0266009 A1 | 9/2017 | Preuss et al. | | |
| 2018/0342329 A1 * | 11/2018 | Rufo | | H04L 12/2812 |
| 2019/0168036 A1 * | 6/2019 | Conboy | | A62C 3/0242 |
| 2020/0090492 A1 * | 3/2020 | Flaster | | H04W 4/90 |

\* cited by examiner

REMOTELY CONTROLLED INTEGRATED PORTABLE BATTERY-POWERED VARIABLE-PRESSURE ELECTRIC PUMP AND POWER EMERGENCY STATION

CROSS-REFERENCE TO RELATED APPLICATION

This application is a continuation-in-part of U.S. patent application Ser. No. 16/683,806, filed Nov. 14, 2019, which is a continuation-in-part of U.S. patent application Ser. No. 16/552,957, filed Aug. 27, 2019, now U.S. Pat. No. 10,722,740, which is a continuation-in-part of U.S. patent application Ser. No. 16/539,959, filed Aug. 13, 2019, now U.S. Pat. No. 10,716,963, which is a continuation-in-part of U.S. nonprovisional patent application Ser. No. 16/259,883, filed Jan. 28, 2019, now U.S. Pat. No. 10,393,126, and claims priority to U.S. provisional patent application No. 62/625,616, filed Feb. 2, 2018. All of the above applications are incorporated by reference herein.

FIELD OF THE INVENTION

The invention relates to portable electric, variable-pressure liquid pumps, in general, and to portable electric liquid fire pumps and liquid transfer pumps, battery backup electric power supplies, remote alert monitoring and triggering and area water pressure boosting, in particular.

BACKGROUND

Changing climatic, weather and building patterns in the United States and around the world have placed many homes and commercial properties in closer proximity to flood and wildfire events (https://www.wsj.com/articles/why-californians-were-drawn-toward-the-fire-zones-1544202053?mod=searchresults&page=1&pos=1). In California alone more than 1 million housing units are at high or very high risk for fire (Jonathan Cooper, AP SDUT C2 Jan. 5, 2018). The increased frequency with which wildfires occur, longer annual fire seasons, a resultant thinning of community fire-fighting resources and official advice to both create "defensible spaces" and "shelter in place" intensifies the need for self-reliance in the event of such emergencies.

Recent news footage from Northern and Southern California wildfires feature desperate homeowners using garden hoses to protect their properties. Such low-pressure solutions offer limited potential for defense. Moreover, such close-in tactics place amateur responders in intimate range of danger. Rapid fire spread and possible terrain access limitations (smoke, flooding, landslides, power outages, tree or rock falls) might delay or prevent professional or volunteer emergency personnel access to particular home sites or businesses.

While a number of personal portable diesel and gas fueled fire pumps are available for fire suppression and prevention, the nature of their fuel source makes them difficult to use and maintain in a fire situation. Gas and diesel-fueled fire pumps are inherently limited by the size of their fuel tanks, the need to store and access flammable liquids near fire events and the complications associated with water pump priming. Furthermore, starting and regulating an internal combustion engine is a relatively complex process during time-critical events. Patents and products for electrically powered systems are for decidedly industrial or large-scale commercial applications and are of limited portability.

Further, some homeowners, offices and industries find themselves facing multiple emergency situations simultaneously, in succession or episodically; needing to counter flooding, fire, loss of electrical power and/or loss of area water pressure.

SUMMARY OF THE INVENTION

Recognized is a need for a product that contains or embodies a fully integrated, portable, user-programmable and remotely triggered platform capable of addressing the variety of emergency situations outlined above.

An aspect of the invention is an emergency station that is user-programmable and remotely triggerable platform capable of addressing and monitoring a variety of emergency situations including flood, fire, loss of area water pressure and power outages. The invention will consist of an integrated, battery-powered, portable, variable-pressure electric liquid pump and power system for personal, residential, military, commercial and emergency service application. The entire system will be on a wheeled cart making it portable so that that it can be moved by an able-bodied person. The cart will feature an electric motor to power the platform's rear wheels to improve its portability.

The emergency station has the capability to monitor various wireless frequencies to detect electronic emergency and alert signals which may then trigger alarms (visual and audio), activate various onboard and ancillary electrical equipment and/or begin the Station's top-off battery charging. The Station can be user configured to enable particular suites of preset and/or user programmable functions. Furthermore, the Emergency station is designed to be remotely controlled through WIFI, radio, satellite, or phone applications.

The emergency station provides commercial, civic, industrial, military and emergency service personnel as well as consumers with support in firefighting, fire prevention as well as liquid pumping & transfer (flood mitigation), water system pressure boosting capabilities, and a battery system that may be used as an ongoing or backup home/office power supply.

The emergency station is portable, and its primary power source will be rechargeable batteries with additional power options. The emergency station will feature an electric motor to power its platform's rear wheels and assist in its portability. It will additionally include an electrically powered, variable-pressure liquid pump.

Unattended, the emergency station receives emergency alerts from FEMA, NOAA and other local and regional fire, civil defense, police, military and/or local, private or commercial emergency services (for example SDEmergency) to trigger battery charging and/or other user-defined emergency functions (i.e. audible and/or visible alarms, local power supply enhancement, liquid pumping and transfer, local water system pressure augmentation, etc.). The emergency station may be further configured to enable particular suites of preset and/or user-programmable functions. Furthermore, the Emergency station may be remotely triggered and/or controlled by authorized users through WIFI, radio, satellite, or phone signals.

The emergency station Central Processing Unit (CPU) provides system power management. The emergency station's control panel, Graphical User Interfaces (GUI) and displays will provide information including water pressure, remaining battery time and charging status. With user input, the CPU will be able to calculate and display, in minutes or gallons, the emergency station's remaining supply of liquid resources. The CPU will have the ability to interface, both wirelessly and through onboard USB data ports, with outside emergency service feeds though onboard optional connected devices (i.e. mobile phones, tablets, etc.) to display real-time emergency information including wind speed, weather forecasts and video updates.

Another aspect of the invention involves an integrated, portable, battery-powered, variable-pressure electric liquid pump and power emergency station comprising a chassis; one or more wheels supporting the chassis; an electrically powered, variable-pressure liquid pump carried by the chassis; one or more rechargeable batteries powering the variable-pressure liquid pump to transfer liquid at variable pressures from a liquid source to a liquid or solid destination area; and one or more AC outlets carried by the chassis and powered by the one or more rechargeable batteries to provide emergency back-up power during power outage. The destination area including, but not limited to one or more of the following:

Burning House,
Burning or Structure,
Burning Trees, Brush, Grass, etc.,
Dry Tinder, Structures, Trees, Brush, Grass, etc.,
Rivers, Lakes, Oceans, Water Storage Containers, Land or Ground, etc.

One or more implementations of the immediately above aspect of the invention involves one or more of the following: the emergency station includes one or more wireless communication components that receive wireless signals and at least one hardware processor; and one or more software modules that, when executed by at least one hardware processor, enable remote control of the emergency station by a mobile computing device application via at least one hardware processor and one or more of WIFI and radio signals received by the one or more wireless communication components; the emergency station includes at least one hardware processor; and one or more software modules that, when executed by at least one hardware processor, receive incoming signals representative of emergency alert communication signals from one or more of FEMA, NOAA, fire services, police services, military services, and/or local private or commercial emergency services and emergency alert systems; determine if the received incoming signals meet predetermined criteria indicative of an emergency; cause the one or more rechargeable batteries to be fully charged upon determination that the received incoming signals meet the predetermined criteria; a visual alarm, and the one or more software modules that, when executed by at least one hardware processor, cause actuation of the visual alarm upon determination that the received incoming signals meet the predetermined criteria; an audible alarm, and the one or more software modules that, when executed by at least one hardware processor, cause actuation of the audible arm upon determination that the received incoming signals meet the predetermined criteria; at least one hardware processor; and one or more software modules that, when executed by at least one hardware processor, receive incoming signals representative of emergency alert communication signals from one or more of FEMA, NOAA, fire services, police services, military services, and/or local emergency services; determine if the received incoming signals meet predetermined criteria indicative of an emergency; cause actuation of one or more of onboard electrical equipment and ancillary electrical equipment upon determination that the received incoming signals meet the predetermined criteria; a user control and display panel and at least one hardware processor; and one or more software modules that, when executed by at least one hardware processor, causes the user control and display panel to display water pressure of the variable-pressure liquid pump, remaining battery time of the one or more rechargeable batteries, and charging status of the one or more rechargeable batteries when the variable-pressure liquid pump is actuated via the user control and display panel; a user control and display panel and at least one hardware processor; and one or more software modules that, when executed by at least one hardware processor, causes the user control and display panel to display at least one of duration and volume of the remaining supply of liquid resources when the variable-pressure liquid pump is actuated via the user control and display panel; a user control and display panel and at least one hardware processor; and one or more software modules that, when executed by at least one hardware processor, initiate activation of the electrically powered, variable-pressure liquid pump at variable pressures to address a fire when the variable-pressure liquid pump is actuated via the user control and display panel; a user control and display panel and at least one hardware processor; and one or more software modules that, when executed by at least one hardware processor, initiate activation of the electrically powered, variable-pressure liquid pump at variable pressures to address a flood when the variable-pressure liquid pump is actuated via the user control and display panel; a user control and display panel and at least one hardware processor; and one or more software modules that, when executed by the at least one hardware processor, initiate activation of the electrically powered, variable-pressure liquid pump at variable pressures to address loss of area water pressure when the variable-pressure liquid pump is actuated via the user control and display panel; a user control and display panel and at least one hardware processor; and one or more software modules that, when executed by at least one hardware processor, supply power to the one or more AC outlets via the one or more rechargeable batteries to provide emergency back-up power during power outage when a corresponding input is actuated via the user control and display panel; an electric motor to power the one or more wheels and at least one hardware processor; and one or more software modules that, when executed by the at least one hardware processor, supply power to the electric motor via the one or more rechargeable batteries to propel the one or more wheels when a corresponding input is actuated in the emergency station; and/or a user control and display panel, one or more ultra-capacitors, and at least one hardware processor; and one or more software modules that, when executed by the at least one hardware processor, engage the one or more ultra-capacitors to supply power to the variable-pressure liquid pump to prime the variable-pressure liquid pump when a corresponding input is actuated via the user control and display panel.

A further aspect of the invention involves an integrated, portable, battery-powered, variable-pressure electric liquid pump and power emergency station, comprising a chassis; an electrically powered, variable-pressure liquid pump carried by the chassis; one or more rechargeable batteries powering the variable-pressure liquid pump to transfer liquid at variable pressures; one or more AC outlets carried by the chassis and powered by the one or more rechargeable batteries to provide emergency back-up power during power outage; one of one or more wired sensors and one or more wireless sensors that provide at least one of real-time heat/temperature, water, smoke, barometric, wind speed, humidity, distance, or seismic data, wherein the emergency station includes at least one hardware processor; and one or more software modules that, when executed by the at least one hardware processor, provide at least one of the emergency station, one or more users, and one more ancillary devices with at least one of real-time heat/temperature, water, smoke, barometric, wind speed, humidity, distance, and seismic data from at least one of the one or more wired sensors and the one or more wireless sensors.

One or more implementations of the immediately above aspect of the invention involves one or more of the following: the emergency station includes one or more wireless communication components that receive wireless signals and at least one hardware processor; and one or more software modules that, when executed by the at least one hardware processor, enable continuous monitoring of radio, WIFI, G5, satellite, and blue tooth signals to modify protocols and responses using at least one of machine learning, AI and IOT; the chassis includes a sled to enhance portability of the emergency station; the chassis includes one or more eyelets to facilitate movement of station by crane, chain or rope; outboard sensors, and the at least one hardware processor; and one or more software modules that, when executed by the at least one hardware processor, enable continuous monitoring of radio, WIFI, G5, satellite, and blue tooth signals to modify protocols and responses using at least one of machine learning, AI and IOT in combination with the outboard sensors and remote user input; the at least one hardware processor; and the one or more software modules that, when executed by the at least one hardware processor, initiates at least one of real-time wired and wireless signaling to owner, home or business automation systems, emergency services, insurance company or alarm company interfaces to continuously update data on status of emergency; the at least one hardware processor; and the one or more software modules that, when executed by the at least one hardware processor, initiates wired and/or wireless signaling to user-determined outboard equipment via at least one of wired, WIFI, G5, and RF to activate user pre-selected functions; initiates at least one of real-time wired and wireless signaling to owner, home or business automation systems, emergency services, insurance company or alarm company interfaces to continuously update data on status of emergency; the at least one hardware processor; and the one or more software modules that, when executed by the at least one hardware processor, enables ongoing, two-way communication with at least one of an owner and a designee to at least one of monitor and control activities of the emergency station; the emergency station includes a plurality of the emergency stations wirelessly connected to form a data and mitigation network; each of the plurality of emergency stations include at least one hardware processor; and one or more software modules that, when executed by the at least one hardware processor, enable continuous monitoring of radio, WIFI, G5, satellite, and blue tooth signals to modify protocols and responses using at least one of machine learning, AI and IOT; the at least one hardware processor; and one or more software modules that, when executed by the at least one hardware processor, continuously monitor verify, authenticate and correct incoming signals in order to modify, error correct and update actions and protocols of the plurality of emergency stations; the emergency station includes memory that stores data related to at least one of insight into emergency progress and situation status data, which could be used as a research tool; the at least one hardware processor; and the one or more software modules that, when executed by the at least one hardware processor, determine if the received incoming signals meet predetermined criteria indicative of an emergency including at least one of home fire, wild fire, earthquake, tornado, hurricane, typhoon, severe thunderstorm, flash flooding, tsunami and at least one of alert a user and cause actuation of one or more of onboard electrical equipment and ancillary electrical equipment upon determination that the received incoming signals meet the predetermined criteria; and/or the at least one hardware processor; and the one or more software modules that, when executed by the at least one hardware processor, receive incoming signals representative of emergency alert communication signals from one or more of FEMA, NOAA, fire services, police services, military services, and local emergency services; determine if the received incoming signals meet predetermined criteria indicative of an emergency; cause actuation of one or more of onboard electrical equipment and ancillary electrical equipment upon determination that the received incoming signals meet the predetermined criteria, wherein one or more of onboard electrical equipment and ancillary electrical equipment includes one or more of causing the one or more rechargeable batteries to be fully charged, activation of the variable-pressure liquid pump at user predetermined rates, and power the one or more AC outlets.

A still further aspect of the invention involves an integrated, portable, battery-powered, variable-pressure electric liquid pump and power emergency station, comprising a chassis; an electrically powered, variable-pressure liquid pump carried by the chassis; one or more rechargeable batteries powering the variable-pressure liquid pump to transfer liquid at variable pressures; one or more AC outlets carried by the chassis and powered by the one or more rechargeable batteries to provide emergency back-up power during power outage; wherein the emergency station includes one or more wireless communication components that receive wireless signals, at least one hardware processor; and one or more software modules that, when executed by the at least one hardware processor, enable continuous monitoring of radio, WIFI, G5, satellite, and blue tooth signals to modify protocols and responses using at least one of machine learning, AI and IOT.

One or more implementations of the immediately above aspect of the invention involves one or more of the following: at least one of one or more wired sensors and one or more wireless sensors that provide at least one of real-time heat/temperature, water, smoke, barometric, wind speed, humidity, distance, or seismic data, and the at least one hardware processor; and the one or more software modules that, when executed by the at least one hardware processor, provide at least one of the emergency station, one or more users, and one more ancillary devices with at least one of real-time heat/temperature, water, smoke, barometric, wind speed, humidity, distance, and seismic data from at least one of the one or more wired sensors and the one or more wireless sensors; outboard sensors, and the at least one hardware processor; and the one or more software modules that, when executed by the at least one hardware processor, enable continuous monitoring of radio, WIFI, G5, satellite, and blue tooth signals to modify protocols and responses using at least one of machine learning, AI and IOT in combination with the outboard sensors and remote user input; the at least one hardware processor; and the one or more software modules that, when executed by the at least one hardware processor, initiates at least one of real-time wired and wireless signaling to owner, home or business automation systems, emergency services, insurance company or alarm company interfaces to continuously update data on status of emergency; the at least one hardware processor; and the one or more software modules that, when executed by the at least one hardware processor, enables ongoing, two-way communication with at least one of an owner and a designee to at least one of monitor and control activities of the emergency station; the emergency station includes memory that stores data related to at least one of insight into emergency progress and situation status data, which could be used as a research tool; and/or the at least one hardware processor; and the one or more software modules that, when executed by the at least one hardware processor, determine if the received incoming signals meet predetermined criteria indicative of an emergency including at least one of home fire, wild fire, earthquake, tornado, hurricane, typhoon, severe thunderstorm, flash flooding, tsunami and at least one of alert a user and cause actuation of one or more of onboard electrical equipment and ancillary electrical equipment upon determination that the received incoming signals meet the predetermined criteria.

An additional aspect of the invention involves an integrated, portable, battery-powered, variable-pressure electric liquid pump and power emergency station a chassis; an electrically powered, variable-pressure liquid pump carried by the chassis; one or more rechargeable batteries powering the variable-pressure liquid pump to transfer liquid at variable pressures; one or more AC outlets carried by the chassis and powered by the one or more rechargeable batteries to provide emergency back-up power during power outage; wherein the emergency station includes at least one hardware processor; and one or more software modules that, when executed by the at least one hardware processor, initiates at least one of wireless signaling and wire-based signaling to user-determined outboard equipment to activate user pre-selected functions.

One or more implementations of the immediately above aspect of the invention involves one or more of the following: the at least one hardware processor; and the one or more software modules that, when executed by the at least one hardware processor, enable continuous monitoring of radio, WIFI, G5, satellite, and blue tooth signals to modify protocols and responses using at least one of machine learning, AI and IOT in combination with the outboard sensors and remote user input; the at least one hardware processor; and the one or more software modules that, when executed by the at least one hardware processor, initiates at least one of real-time wired and wireless signaling to owner, home or business automation systems, emergency services, insurance company or alarm company interfaces to continuously update data on status of emergency; the at least one hardware processor; and the one or more software modules that, when executed by the at least one hardware processor, enables ongoing, two-way communication with at least one of an owner and a designee to at least one of monitor and control activities of the emergency station; the emergency station includes memory that stores data related to at least one of insight into emergency progress and situation status data, which could be used as a research tool; the at least one hardware processor; and the one or more software modules that, when executed by the at least one hardware processor, determine if the received incoming signals meet predetermined criteria indicative of an emergency including at least one of home fire, wild fire, earthquake, tornado, hurricane, typhoon, severe thunderstorm, flash flooding, tsunami and at least one of alert a user and cause actuation of one or more of onboard electrical equipment and ancillary electrical equipment upon determination that the received incoming signals meet the predetermined criteria; at least one of one or more wired sensors and one or more wireless sensors that provide at least one of real-time heat/temperature, water, smoke, barometric, wind speed, humidity, distance, or seismic data, and the at least one hardware processor; and the one or more software modules that, when executed by the at least one hardware processor, provide at least one of the emergency station, one or more users, and one more ancillary devices with at least one of real-time heat/temperature, water, smoke, barometric, wind speed, humidity, distance, and seismic data from at least one of the one or more wired sensors and the one or more wireless sensors; and/or the user-determined outboard equipment is at least one of one or more transponders, one or more transmitters, one or more generators, one or more alarms, or others.

Another aspect of the invention involves an integrated, portable, battery-powered, power emergency station, comprising one or more rechargeable batteries; one or more AC outlets powered by the one or more rechargeable batteries to provide emergency back-up power during power outage, wherein the emergency station includes at least one hardware processor; and one or more software modules that, when executed by the at least one hardware processor, receive incoming signals representative of emergency alert communication signals from one or more of FEMA, NOAA, fire services, police services, military services, local emergency services, broadcasters, private networks, and commercial networks; determine if the received incoming signals meet predetermined criteria indicative of an emergency; cause the one or more rechargeable batteries to be fully charged upon determination that the received incoming signals meet the predetermined criteria.

One or more implementations of the immediately above aspect of the invention involves one or more of the following: the emergency station includes one or more wireless communication components that receive wireless signals and at least one hardware processor; and one or more software modules that, when executed by the at least one hardware processor, enable remote control of the emergency station by a mobile computing device application via the at least one hardware processor and one or more of WIFI and radio signals received by the one or more wireless communication components; at least one of an onboard or ancillary visual alarm, and an onboard or ancillary audible alarm, and the one or more software modules that, when executed by the at least one hardware processor, cause actuation of at least one of the visual and the audible alarm upon determination that the received incoming signals meet the predetermined criteria; a user control and display panel and at least one hardware processor; and one or more software modules that, when executed by the at least one hardware processor, causes the user control and display panel to display remaining battery time of the one or more rechargeable batteries, and charging status of the one or more rechargeable batteries; a user control and display panel and at least one hardware processor; and one or more software modules that, when executed by the at least one hardware processor, supply power to the one or more AC outlets via the one or more rechargeable batteries to provide emergency back-up power during power outage when a corresponding input is actuated via the user control and display panel.

A further aspect of the invention involves an integrated, portable, battery-powered, power emergency station, comprising one or more rechargeable batteries; one or more AC outlets powered by the one or more rechargeable batteries to provide emergency back-up power during power outage, wherein the emergency station includes at least one hardware processor; and one or more software modules that, when executed by the at least one hardware processor, receive incoming signals representative of emergency alert communication signals from one or more of FEMA, NOAA, fire services, police services, military services, and local emergency services; determine if the received incoming signals meet predetermined criteria indicative of an emergency; cause actuation of one or more of onboard electrical equipment and ancillary electrical equipment upon determination that the received incoming signals meet the predetermined criteria, wherein one or more of onboard electrical equipment and ancillary electrical equipment includes one or more of causing the one or more rechargeable batteries to be fully charged, and power the one or more AC outlets.

One or more implementations of the immediately above aspect of the invention involves one or more of the following: the emergency station includes one or more wireless communication components that receive wireless signals and at least one hardware processor; and one or more software modules that, when executed by the at least one hardware processor, enable remote control of the emergency station by a mobile computing device application via the at least one hardware processor and one or more of WIFI and radio signals received by the one or more wireless communication components; and/or a user control and display panel and at least one hardware processor; and one or more software modules that, when executed by the at least one hardware processor, causes the user control and display panel to display remaining battery time of the one or more rechargeable batteries, and charging status of the one or more rechargeable batteries.

A still further aspect of the invention involves an integrated, portable, battery-powered power emergency station, comprising one or more rechargeable batteries; one or more AC outlets carried by the chassis and powered by the one or more rechargeable batteries to provide emergency back-up power during power outage; one of one or more wired sensors and one or more wireless sensors that provide at least one of real-time heat or temperature, smoke, barometric, wind speed, humidity, distance, or seismic data, wherein the emergency station includes at least one hardware processor; and one or more software modules that, when executed by the at least one hardware processor, provide at least one of the emergency station, one or more users, and one more ancillary devices with at least one of real-time heat, temperature, smoke, barometric, wind speed, humidity, distance, and seismic data from at least one of the one or more wired sensors and the one or more wireless sensors to trigger wired or wireless activations of various ancillary devices including one or more of pumps, heaters, and alarms.

One or more implementations of the immediately above aspect of the invention involves one or more of the following: the emergency station includes one or more wireless communication components that receive wireless signals and the at least one hardware processor; and the one or more software modules that, when executed by the at least one hardware processor, enable continuously monitoring, verifying, authenticating, and correcting of the received wireless signals in order to modify, error correct, and update station actions and protocols; the at least one hardware processor; and the one or more software modules that, when executed by the at least one hardware processor, perform at least one of the following: initiates at least one of real-time wired and wireless signaling to owner, home or business automation systems, emergency services, insurance company or alarm company interfaces to continuously update data on status of emergency; and initiates wireless signaling to user-determined outboard equipment via wireless signals to activate user pre-selected functions; the at least one hardware processor; and the one or more software modules that, when executed by the at least one hardware processor, enables ongoing, two-way communication with at least one of an owner and designees to at least one of monitor and control activities of the emergency station; and/or the emergency station includes a plurality of the emergency stations wirelessly connected to form a network; each of the plurality of emergency stations include the at least one hardware processor; and the one or more software modules that, when executed by the at least one hardware processor, enable continuously monitoring, verifying, authenticating, and correcting of incoming signals in order to modify, error correct, and update station actions and protocols; the emergency station includes memory that stores data related to at least one of insight into emergency progress and situation status data, which could be used as a research tool; the at least one hardware processor; and the one or more software modules that, when executed by the at least one hardware processor, determine if the received incoming signals meet predetermined criteria indicative of an emergency including at least one of home fire, wild fire, earthquake, tornado, hurricane, typhoon, freezes, severe thunderstorm, flash flooding, tsunami and at least one of alert a user and cause actuation of one or more of onboard electrical equipment and ancillary electrical equipment upon determination that the received incoming signals meet the predetermined criteria; and/or the at least one hardware processor; and the one or more software modules that, when executed by the at least one hardware processor, initiates at least one of real-time wired and wireless signaling to owner, home or business automation systems, emergency services, insurance company or alarm company interfaces to continuously update data on status of emergency.

An additional aspect of the invention involves an integrated, portable, battery-powered power emergency station comprising one or more rechargeable batteries; one or more AC outlets carried by the chassis and powered by the one or more rechargeable batteries to provide emergency back-up power during power outage; one of one or more wired sensors and one or more wireless sensors that provide at least one of real-time heat, smoke, barometric, wind speed, humidity, distance, or seismic data, wherein the emergency station includes at least one hardware processor; and one or more software modules that, when executed by the at least one hardware processor, initiates at least one of wireless signaling and wire-based signaling to user-determined outboard equipment to activate user pre-selected functions.

One or more implementations of the immediately above aspect of the invention involves one or more of the following: the emergency station includes one or more wireless communication components that receive wireless signals and the at least one hardware processor; and the one or more software modules that, when executed by the at least one hardware processor, enable continuously monitoring, verifying, authenticating, and correcting of the received wireless signals in order to modify, error correct, and update station actions and protocols; outboard sensors, and the at least one hardware processor; and the one or more software modules that, when executed by the at least one hardware processor, enable continuously monitoring, verifying, authenticating, and correcting of the received wireless signals in order to modify, error correct, and update station actions and protocols in combination with the outboard sensors and remote user input; the at least one hardware processor; and the one or more software modules that, when executed by the at least one hardware processor, perform at least one of the following: initiates at least one of real-time wired and wireless signaling to owner, home or business automation systems, emergency services, insurance company or alarm company interfaces to continuously update data on status of emergency; the at least one hardware processor; and the one or more software modules that, when executed by the at least one hardware processor, enables ongoing, two-way communication with at least one of an owner and a designee to at least one of monitor and control activities of the emergency station; the emergency station includes a plurality of the emergency stations wirelessly connected to form a data and mitigation network; each of the plurality of emergency stations include the at least one hardware processor; and the one or more software modules that, when executed by the at least one hardware processor, enable continuously monitoring, verifying, authenticating, and correcting of incoming signals in order to modify, error correct, and update station actions and protocols of the plurality of emergency stations; the emergency station includes memory that stores data related to at least one of insight into emergency progress and situation status data, which could be used as a research tool; the at least one hardware processor; and the one or more software modules that, when executed by the at least one hardware processor, determine if the received incoming signals meet predetermined criteria indicative of an emergency including at least one of home fire, wild fire, earthquake, tornado, hurricane, typhoon, severe thunderstorm, flash flooding, tsunami, power outages or disruptions and at least one of alert a user and cause actuation of one or more of onboard electrical equipment and ancillary electrical equipment upon determination that the received incoming signals meet the predetermined criteria; the at least one hardware processor; and the one or more software modules that, when executed by the at least one hardware processor, receive incoming signals representative of emergency alert communication signals from one or more of FEMA, NOAA, fire services, police services, military services, local emergency services, broadcasters and private and commercial networks; determine if the received incoming signals meet predetermined criteria indicative of an emergency; cause actuation of one or more of onboard electrical equipment and ancillary electrical equipment upon determination that the received incoming signals meet the predetermined criteria, wherein one or more of onboard electrical equipment and ancillary electrical equipment includes one or more of causing the one or more rechargeable batteries to be fully charged, activation of the variable-pressure liquid pump at user predetermined rates, and power the one or more AC outlets; the at least one hardware processor; and the one or more software modules that, when executed by the at least one hardware processor, receive incoming signals representative of emergency alert communication signals from one or more of FEMA, NOAA, fire services, police services, military services, local emergency services, broadcasters and private and commercial networks; determine if the received incoming signals meet predetermined criteria indicative of an emergency; initiate at least one of wireless signaling and wire-based signaling to user-determined outboard equipment to activate user pre-selected functions; at least one of one or more wired sensors and one or more wireless sensors that provide at least one of real-time heat, water, smoke, barometric, wind speed, humidity, distance, or seismic data, and the at least one hardware processor; and the one or more software modules that, when executed by the at least one hardware processor, provide at least one of the emergency station, one or more users, and one more ancillary devices with at least one of real-time heat, water, smoke, barometric, wind speed, humidity, distance, and seismic data from at least one of the one or more wired sensors and the one or more wireless sensors; and/or the user-determined outboard equipment is at least one of transponders, one or more transmitters, one or more generators, and one or more alarms.

Another aspect of the invention involves an emergency controller for an integrated, portable, battery-powered, power emergency station including one or more rechargeable batteries; one or more AC outlets powered by the one or more rechargeable batteries to provide emergency back-up power during power outage, comprising at least one hardware processor; and one or more software modules that, when executed by the at least one hardware processor, receive incoming signals representative of emergency alert communication signals from one or more of FEMA, NOAA, fire services, police services, military services, local emergency services, broadcasters and private and commercial networks; determine if the received incoming signals meet predetermined criteria indicative of an emergency; cause the one or more rechargeable batteries to be fully charged upon determination that the received incoming signals meet the predetermined criteria.

One or more implementations of the immediately above aspect of the invention involves one or more of the following: the emergency controller includes one or more wireless communication components that receive wireless signals and the at least one hardware processor; and that one or more software modules that, when executed by the at least one hardware processor, enable remote control of the emergency station by a mobile computing device application via the at least one hardware processor and one or more of WIFI and radio signals received by the one or more wireless communication components; a visual alarm, and the one or more software modules that, when executed by the at least one hardware processor, cause actuation of the visual alarm upon determination that the received incoming signals meet the predetermined criteria; an audible alarm, and the one or more software modules that, when executed by the at least one hardware processor, cause actuation of the audible arm upon determination that the received incoming signals meet the predetermined criteria; a user control and display panel and at least one hardware processor; and one or more software modules that, when executed by the at least one hardware processor, causes the user control and display panel to display remaining battery time of the one or more rechargeable batteries, and charging status of the one or more rechargeable batteries; a user control and display panel and at least one hardware processor; and one or more software modules that, when executed by the at least one hardware processor, supply power to the one or more AC outlets via the one or more rechargeable batteries to provide emergency back-up power during power outage when a corresponding input is actuated via the user control and display panel.

A further aspect of the invention involves an emergency controller for an integrated, portable, battery-powered, power emergency station including one or more rechargeable batteries; one or more AC outlets powered by the one or more rechargeable batteries to provide emergency back-up power during power outage, comprising at least one hardware processor; and one or more software modules that, when executed by the at least one hardware processor, receive incoming signals representative of emergency alert communication signals from one or more of FEMA, NOAA, fire services, police services, military services, and local emergency services; determine if the received incoming signals meet predetermined criteria indicative of an emergency; cause actuation of one or more of onboard electrical equipment and ancillary electrical equipment upon determination that the received incoming signals meet the predetermined criteria, wherein one or more of onboard electrical equipment and ancillary electrical equipment includes one or more of causing the one or more rechargeable batteries to be fully charged, and power the one or more AC outlets.

One or more implementations of the immediately above aspect of the invention involves one or more of the following: the emergency station includes one or more wireless communication components that receive wireless signals and the at least one hardware processor; and the one or more software modules that, when executed by the at least one hardware processor, enable remote control of the emergency station by a mobile computing device application via the at least one hardware processor and one or more of WIFI and radio signals received by the one or more wireless communication components; and/or a user control and display panel and at least one hardware processor; and one or more software modules that, when executed by the at least one hardware processor, causes the user control and display panel to display remaining battery time of the one or more rechargeable batteries, and charging status of the one or more rechargeable batteries.

A still further aspect of the invention involves an emergency controller for an integrated, portable, battery-powered, power emergency station including one or more rechargeable batteries; one or more AC outlets powered by the one or more rechargeable batteries to provide emergency back-up power during power outage; one of one or more wired sensors and one or more wireless sensors that provide at least one of real-time heat, smoke, barometric, wind speed, humidity, distance, or seismic data, comprising at least one hardware processor; and one or more software modules that, when executed by the at least one hardware processor, provide at least one of the emergency station, one or more users, and one more ancillary devices with at least one of real-time heat or temperature, smoke, barometric, wind speed, humidity, distance, and seismic data from at least one of the one or more wired sensors and the one or more wireless sensors.

One or more implementations of the immediately above aspect of the invention involves one or more of the following: the emergency station includes one or more wireless communication components that receive wireless signals and the at least one hardware processor; and the one or more software modules that, when executed by the at least one hardware processor, enable continuously monitoring, verifying, authenticating, and correcting of the received wireless signals in order to modify, error correct, and update station actions and protocols; outboard sensors, and the at least one hardware processor; and the one or more software modules that, when executed by the at least one hardware processor, enable continuously monitoring, verifying, authenticating, and correcting of incoming signals in order to modify, error correct, and update station actions and protocols in combination with the outboard sensors and remote user input; the at least one hardware processor; and the one or more software modules that, when executed by the at least one hardware processor, perform at least one of the following" initiates at least one of real-time wired and wireless signaling to owner, home or business automation systems, emergency services, insurance company or alarm company interfaces to continuously update data on status of emergency; and initiates wireless signaling to user-determined outboard equipment via wireless signals to activate user pre-selected functions; the at least one hardware processor; and the one or more software modules that, when executed by the at least one hardware processor, enables ongoing, two-way communication with at least one of an owner and a designee to at least one of monitor and control activities of the emergency station; the emergency station includes a plurality of the emergency stations wirelessly connected to form a network; each of the plurality of emergency stations include the at least one hardware processor; and the one or more software modules that, when executed by the at least one hardware processor, enable continuously monitoring, verifying, authenticating, and correcting of incoming signals in order to modify, error correct, and update station actions and protocols; the emergency station includes memory that stores data related to at least one of insight into emergency progress and situation status data, which could be used as a research tool; the at least one hardware processor; and the one or more software modules that, when executed by the at least one hardware processor, determine if the received incoming signals meet predetermined criteria indicative of an emergency including at least one of home fire, wild fire, earthquake, tornado, hurricane, typhoon, severe thunderstorm, freezes, flash flooding, tsunami and at least one of alert a user and cause actuation of one or more of onboard electrical equipment and ancillary electrical equipment upon determination that the received incoming signals meet the predetermined criteria; the at least one hardware processor; and the one or more software modules that, when executed by the at least one hardware processor, initiates at least one of real-time wired and wireless signaling to owner, home or business automation systems, emergency services, insurance company or alarm company interfaces to continuously update data on status of emergency.

An additional aspect of the invention involves an emergency controller for an integrated, portable, battery-powered, power emergency station including one or more rechargeable batteries; one or more AC outlets powered by the one or more rechargeable batteries to provide emergency back-up power during power outage; one of one or more wired sensors and one or more wireless sensors that provide at least one of real-time heat, smoke, barometric, wind speed, humidity, distance, or seismic data, comprising at least one hardware processor; and one or more software modules that, when executed by the at least one hardware processor, initiates at least one of wireless signaling, wire-based signaling, and battery power to at least one of one or more of pumps, one or more lights, one or more alarms, an automatic transfer switch, one or more medical devices, and one or more heaters to activate user pre-selected functions.

One or more implementations of the immediately above aspect of the invention involves one or more of the following: the emergency station includes one or more wireless communication components that receive wireless signals and the at least one hardware processor; and the one or more software modules that, when executed by the at least one hardware processor, enable continuously monitoring, verifying, authenticating, and correcting of the received wireless signals in order to modify, error correct, and update station actions and protocols; outboard sensors, and the at least one hardware processor; and the one or more software modules that, when executed by the at least one hardware processor, enable continuously monitoring, verifying, authenticating, and correcting of the received wireless signals in order to modify, error correct, and update station actions and protocols in combination with the outboard sensors and remote user input; the at least one hardware processor; and the one or more software modules that, when executed by the at least one hardware processor, perform at least one of the following: initiates at least one of real-time wired and wireless signaling to owner, home or business automation systems, emergency services, insurance company or alarm company interfaces to continuously update data on status of emergency; the at least one hardware processor; and the one or more software modules that, when executed by the at least one hardware processor, enables ongoing, two-way communication with at least one of an owner and designees to at least one of monitor and control activities of the emergency station; the emergency station includes a plurality of the emergency stations wirelessly connected to form a data and mitigation network; each of the plurality of emergency stations include the at least one hardware processor; and the one or more software modules that, when executed by the at least one hardware processor, enable continuously monitoring, verifying, authenticating, and correcting of incoming signals in order to modify, error correct, and update station actions and protocols of the plurality of emergency stations; the emergency station includes memory that stores data related to at least one of insight into emergency progress and situation status data, which could be used as a research tool; the at least one hardware processor; and the one or more software modules that, when executed by the at least one hardware processor, determine if the received incoming signals meet predetermined criteria indicative of an emergency including at least one of home fire, wild fire, earthquake, tornado, hurricane, typhoon, severe thunderstorm, freezes, flash flooding, tsunami and at least one of alert a user and cause actuation of one or more of onboard electrical equipment and ancillary electrical equipment upon determination that the received incoming signals meet the predetermined criteria; the at least one hardware processor; and the one or more software modules that, when executed by the at least one hardware processor, receive incoming signals representative of emergency alert communication signals from one or more of FEMA, NOAA, fire services, police services, military services, local emergency services, broadcasters, and private and commercial networks; determine if the received incoming signals meet predetermined criteria indicative of an emergency; cause actuation of one or more of onboard electrical equipment and ancillary electrical equipment upon determination that the received incoming signals meet the predetermined criteria, wherein one or more of onboard electrical equipment and ancillary electrical equipment includes one or more of causing the one or more rechargeable batteries to be fully charged, activation of the variable-pressure liquid pump at user predetermined rates, and power the one or more AC outlets; the at least one hardware processor; and the one or more software modules that, when executed by the at least one hardware processor, receive incoming signals representative of emergency alert communication signals from one or more of FEMA, NOAA, fire services, police services, military services, and local emergency services; determine if the received incoming signals meet predetermined criteria indicative of an emergency; initiate at least one of wireless signaling and wire-based signaling to user-determined outboard equipment to activate user pre-selected functions; at least one of one or more wired sensors and one or more wireless sensors that provide at least one of real-time heat, water, smoke, barometric, wind speed, humidity, distance, or seismic data, and the at least one hardware processor; and the one or more software modules that, when executed by the at least one hardware processor, provide at least one of the emergency station, one or more users, and one more ancillary devices with at least one of real-time heat, water, smoke, barometric, wind speed, humidity, distance, and seismic data from at least one of the one or more wired sensors and the one or more wireless sensors; and/or the user-determined outboard equipment is at least one of transponders, one or more transmitters, one or more generators, one or more pumps, one or more heaters, and one or more alarms.

Another aspect of the invention involves an emergency controller for an integrated, portable, battery-powered, power emergency station including one or more rechargeable batteries; one or more AC outlets powered by the one or more rechargeable batteries to provide emergency back-up power during power outage; one of one or more wired sensors and one or more wireless sensors that provide at least one of real-time heat, smoke, barometric, wind speed, humidity, distance, or seismic data, comprising at least one hardware processor; and one or more software modules that, when executed by the at least one hardware processor, detects a power outage to one of a house and building; activates the one or more rechargeable batteries to provide at least one of signaling and emergency back-up power to at least one of: one or more of pumps, one or more lights, one or more alarms, an automatic transfer switch, one or more medical devices, and one or more heaters.

An additional aspect of the invention involves an integrated, portable, battery-powered, variable-pressure electric liquid pump and power emergency station, comprising a chassis; one or more wheels supporting the chassis; an electrically powered, variable-pressure liquid pump carried by the chassis; one or more rechargeable batteries powering the variable-pressure liquid pump to transfer liquid at variable pressures from a liquid source to a liquid destination; one or more AC outlets carried by the chassis and powered by the one or more rechargeable batteries to provide emergency back-up power during power outage; a remote wireless communication unit located remotely from and in wireless communication with the emergency station, the remote wireless communication unit including at least one hardware processor; and one or more software modules that, when executed by the at least one hardware processor, wirelessly receive incoming signals representative of emergency alert communication signals from one or more of FEMA, NOAA, fire services, police services, military services, local emergency services, an emergency agency, a television station, and a radio station; wirelessly transmit the signals representative of emergency alert communication signals to the emergency station; wherein the emergency station includes at least one hardware processor; and one or more software modules that, when executed by the at least one hardware processor, wirelessly receive the signals representative of emergency alert communication signals from the remote wireless communication unit; determine if the received incoming signals meet predetermined criteria indicative of an emergency; cause actuation of one or more of onboard electrical equipment and ancillary electrical equipment upon determination that the received incoming signals meet the predetermined criteria.

One or more implementations of the immediately above aspect of the invention involves one or more of the following: the one or more of onboard electrical equipment and ancillary electrical equipment includes one or more of causing the one or more rechargeable batteries to be fully charged, activation of the variable-pressure liquid pump at user predetermined rates, and power the one or more AC outlets; the integrated, portable, battery-powered, variable-pressure electric liquid pump and power emergency station is located indoors and the remote wireless communication unit is located outdoors; and/or the remote wireless communication unit is located on a rooftop.

Another aspect of the invention involves a method of using the remote unit of the integrated, portable, battery-powered, variable-pressure electric liquid pump and power emergency station of the aspect of the invention recited most immediately above, and comprises wirelessly receiving incoming signals representative of emergency alert communication signals from one or more of FEMA, NOAA, fire services, police services, military services, local emergency services, an emergency agency, a television station, and a radio station; wirelessly transmitting the signals representative of emergency alert communication signals to the emergency station, where it is determined if the received incoming signals meet predetermined criteria indicative of an emergency and cause actuation of one or more of onboard electrical equipment and ancillary electrical equipment upon determination that the received incoming signals meet the predetermined criteria.

A further aspect of the invention involves a method of using the integrated, portable, battery-powered, variable-pressure electric liquid pump and power emergency station of the aspect of the invention recited most immediately above, and comprises wirelessly receiving the incoming signals representative of emergency alert communication signals from one or more of FEMA, NOAA, fire services, police services, military services, local emergency services, an emergency agency, a television station, and a radio station from the remote unit; determining if the received incoming signals meet predetermined criteria indicative of an emergency; and causing actuation of one or more of onboard electrical equipment and ancillary electrical equipment upon determination that the received incoming signals meet the predetermined criteria.

A still further aspect of the invention involves an integrated, portable, battery-powered, variable-pressure electric liquid pump and power emergency station, comprising a chassis; one or more wheels supporting the chassis; an electrically powered, variable-pressure liquid pump carried by the chassis; one or more rechargeable batteries powering the variable-pressure liquid pump to transfer liquid at variable pressures from a liquid source to a liquid destination; one or more AC outlets carried by the chassis and powered by the one or more rechargeable batteries to provide emergency back-up power during power outage; a remote wireless communication unit located remotely from and in wireless communication with the emergency station; wherein the remote wireless communication unit includes at least one hardware processor; and one or more software modules that, when executed by the at least one hardware processor, wirelessly receive at the remote wireless communication unit incoming signals representative of emergency alert communication signals from one or more of FEMA, NOAA, fire services, police services, military services, local emergency services, an emergency agency, a television station, and a radio station; determine if the received incoming signals meet predetermined criteria indicative of an emergency; wirelessly transmit actuation signals from the remote wireless communication unit to the emergency station, causing actuation of one or more of onboard electrical equipment and ancillary electrical equipment upon determination that the received incoming signals meet the predetermined criteria.

One or more implementations of the immediately above aspect of the invention involves one or more of the following: the one or more of onboard electrical equipment and ancillary electrical equipment includes one or more of causing the one or more rechargeable batteries to be fully charged, activation of the variable-pressure liquid pump at user predetermined rates, and power the one or more AC outlets; the integrated, portable, battery-powered, variable-pressure electric liquid pump and power emergency station is located indoors and the remote wireless communication unit is located outdoors; and/or the remote wireless communication unit is located on a rooftop.

An additional aspect of the invention involves a method of using the remote unit of the integrated, portable, battery-powered, variable-pressure electric liquid pump and power emergency station of the aspect of the invention recited most immediately above, and comprises wirelessly receiving incoming signals representative of emergency alert communication signals from one or more of FEMA, NOAA, fire services, police services, military services, local emergency services, an emergency agency, a television station, and a radio station; determining if the received incoming signals meet predetermined criteria indicative of an emergency; and wirelessly transmit actuation signals from the remote wireless communication unit to the emergency station, causing actuation of one or more of onboard electrical equipment and ancillary electrical equipment upon determination that the received incoming signals meet the predetermined criteria.

DETAILED DESCRIPTION

With reference to FIGS. 1-7, an embodiment of an integrated, battery-powered, portable, variable-pressure electric liquid pump and power emergency station ("emergency station") 100 capable of addressing and monitoring a variety of emergency situations including flood mitigation, fire prevention or suppression (e.g., transfer or pumping of liquids, gels or foams), loss of area water pressure (e.g., water pressure boosting), and power outages (e.g., AC power augmentation) for personal, residential, military, commercial and emergency service applications will be described. The emergency station 100 includes embodiments of 1) an emergency station chassis and housing, 2) an emergency station electrical system, 3) an emergency station computer system, 4) an emergency station user control/display and monitoring system, and 5) an emergency station liquid pump system, each of which will be described in turn below.

1. Emergency Station Chassis and Housings

Figure 1:
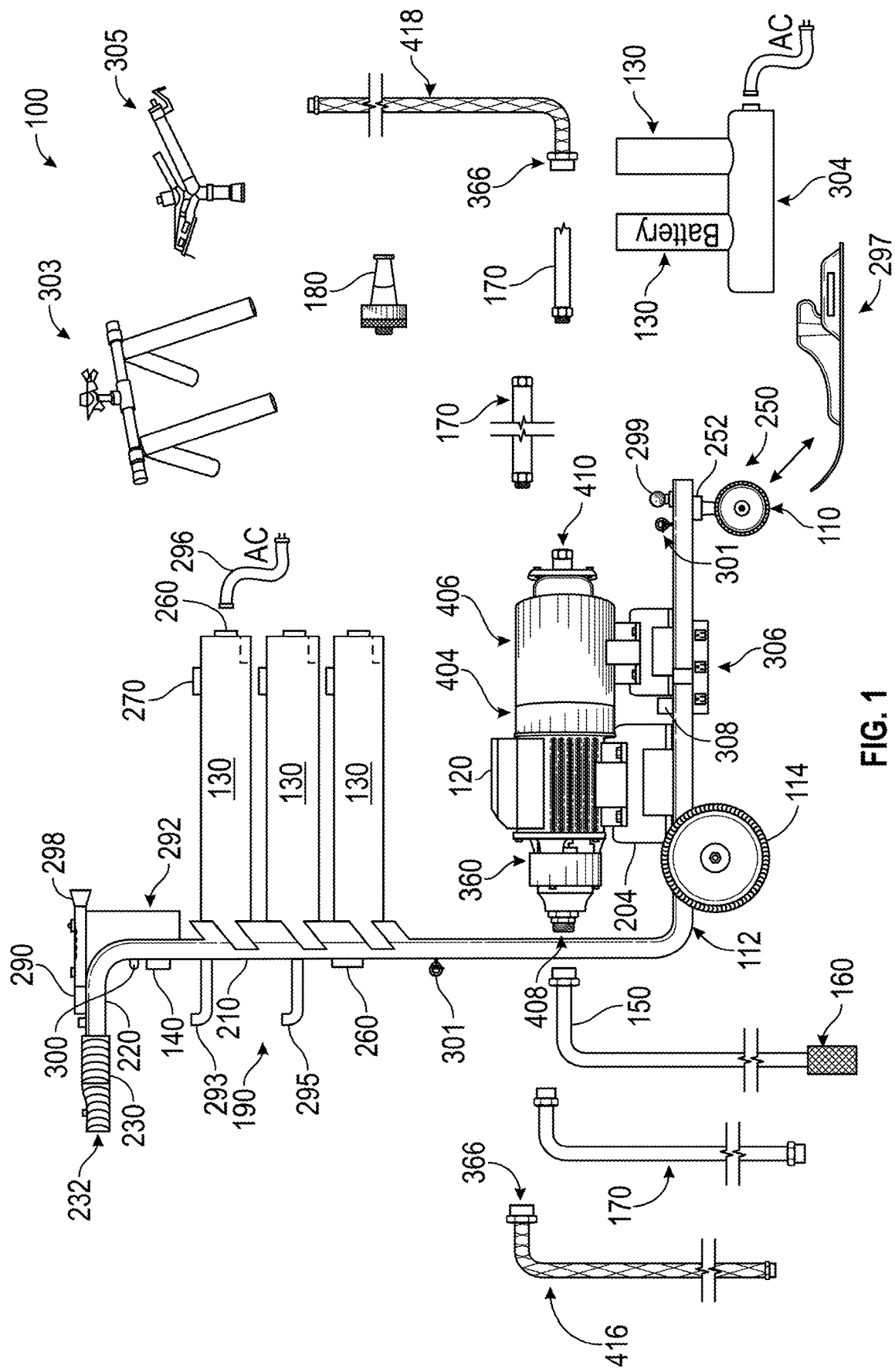
FIG. 1 is a side elevational view of an embodiment of the integrated, portable emergency station.

FIG. 1 illustrates an embodiment of an emergency station chassis and housing 110 of the emergency station 100. In the embodiment shown, the chassis and housing 110 is a wheeled cart, making it portable so that that it can be moved by an able-bodied person. The emergency station 100 includes an electric motor 112 to power rear wheels 114 to improve the emergency station's portability. The emergency station 100 may alternately be placed in a stationary position for storage or use in monitoring or power augmentation modes.

The cart 110 includes an L-shaped frame 190 with a horizontal frame member 200, a vertical frame member 210, and a horizontal handle frame member 220 with handle grip(s) 230 extending laterally rearward from the vertical frame member 210. A variable speed throttle 232 is located on one of the grip(s) 230 to control the electric motor 112 powering the rear two wheels 114. The throttle 232 has on/off, neutral, reverse and variable speed options. A rotating front wheel 250 on a swivel 252 provides the emergency station 100 with additional support and directional stability.

A user control and display panel 290 is supported by the horizontal handle frame member 220. Monitoring and computer system(s) 292 is located below user control and display panel 290 and attached to the vertical frame member 210. Suction hose hanger 293 and fire hose hanger 295 are located on an opposite side of vertical frame member 210. The electric pump/compressor/pressurizer 120 is supported by the horizontal frame member 200 via supports 204, 206.

In front of the electric pump/compressor/pressurizer 120, the chassis 110 may include a sled 297 with a hitch attachment 299 to replace the front wheel 250 to enhance portability. The front of the chassis 110 may also include one or more eyelets 301 to facilitate movement of station by crane, chain or for rope hoisting.

2. Emergency Station Electrical Systems

Figure 2:
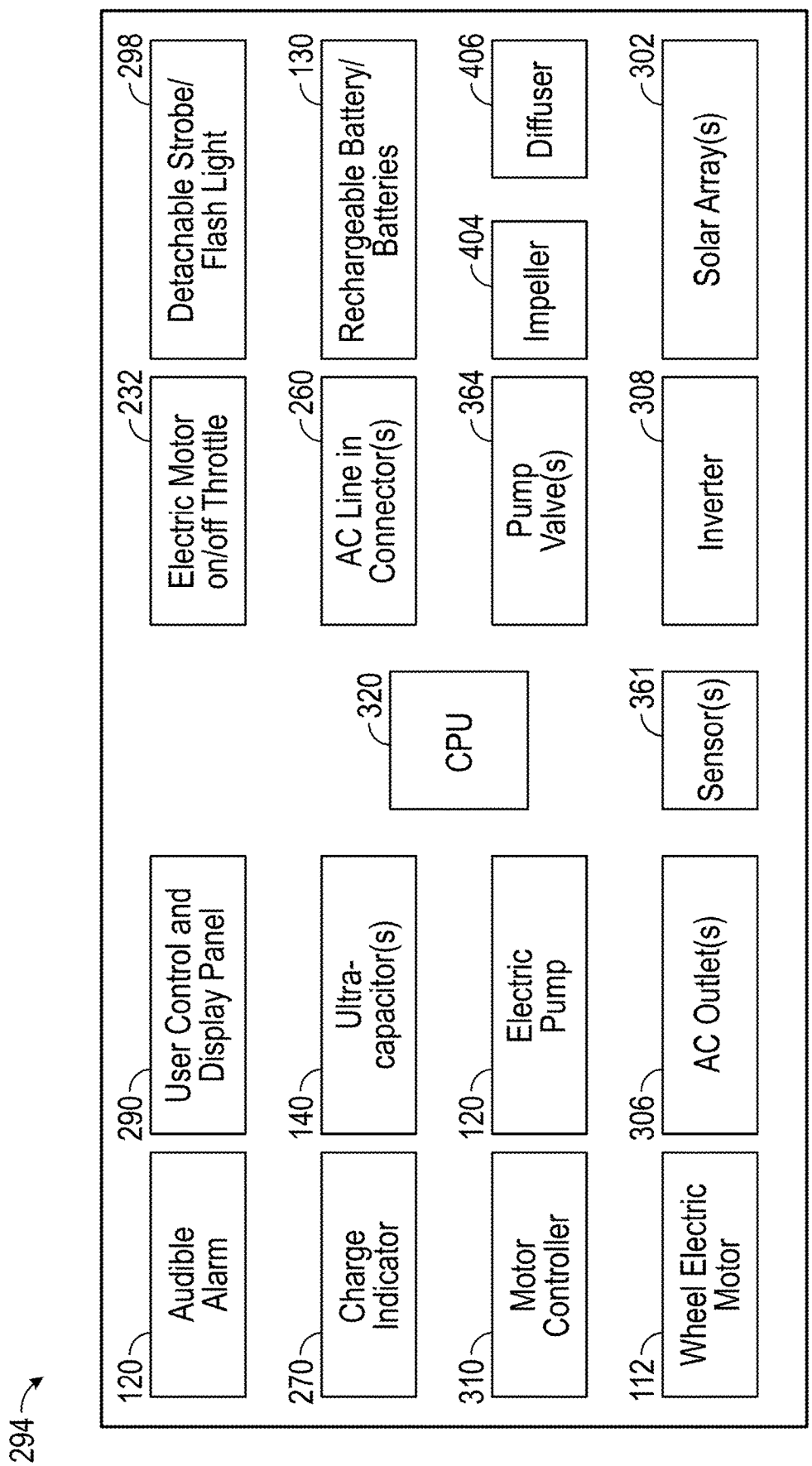
FIG. 2 is a block diagram illustrating an embodiment of an electrical system of the emergency station.

With reference additionally to FIG. 2, an embodiment of an electrical system 294 of the emergency station 100 including various electrical systems and features will be described.

The system's power sources include an outboard 120V, 240V, or the like supply connected via a standard power cord via AC line in connector 260 and/or one or more onboard interchangeable, removable, hot-swappable rechargeable batteries 130. The batteries 130 and rechargeable onboard ultra-capacitor 140 are supported by the vertical frame member 210. Power management circuitry is integrated into the system 294 to use the rechargeable batteries 130 to power the electric fire pump/compressor/pressurizer 120, electric wheel motor(s) 112, and monitoring and computer system(s) 292. The rechargeable ultra-capacitor(s) 140 provide an initial current surge to start and/or prime the electric fire pump/compressor/pressurizer 120.

Both the rechargeable batteries 130 and the ultra-capacitor(s) 140 are sealed and their connectors enclosed when mechanically locked into the station's chassis and housing 110 to prevent accidental discharge if damaged, submerged or in contact with water or any conductive liquid or solid. The emergency station 100 includes circuitry to prevent discharge of its power sources should the emergency station 100 be damaged or submerged in water or any conductive liquid. Both the rechargeable batteries 130 and the ultra-capacitor(s) 140 are emergency/military-grade and resistant to high heat and fire. Features of the power sources include one or more of the following:

- battery powered with single or multiple stackable and rechargeable batteries for portable use;
- single charged battery which starts and runs system for one hour;
- outboard AC 120 Volt power connection operation and/or battery recharge;
- ultra-capacitor(s) for initial electric motor power surge;
- all power sources being hot-swappable An exemplary AC power augmentation method of use will be described. The emergency station 100 is battery or AC-powered both during regular operation and in standby mode for emergency alert monitoring and triggering. In standby mode, batteries and ultra-capacitors 140 are charged to optimal storage rates and then triggered to fully charge either manually or automatically by user assigned and specified remote signals. Such activations may also be programmed to trigger a detachable 1,000 lumen flashlight/strobe 298 and/or 120 db audible alarm 300.

The electric fire pump/compressor/pressurizer 120 may be alternatively powered by connecting the power cord 296 to an outboard 120-volt AC source. With advance warning, the emergency station 100 is charged manually. The emergency station 100 may rely on available AC (110V) or optional solar arrays 302 for power while simultaneously charging the unit's batteries 130.

The one or more AC line in connectors 260 are provided for charging the one or more rechargeable batteries 130.

Batteries 130 may also be charged externally via 120-volt AC power source while in a charging station 304.

Three or more 15-amp 120V AC, 240V, or the like connectors/outlets 306 are located onboard for powering ancillary devices (e.g., lighting, sump pumps, household appliances) via an inverter 308. Power to each onboard outlet 306 may be user-preset to be manually or remotely triggered depending on a switch position.

An electric motor controller 360 controls the variable speed electric pump/compressor/pressurizer 120.

One or more wired and/or wireless sensors 361 provide emergency station 100, its users, and ancillary devices with real-time heat/temperature, water, smoke, barometric, wind speed, humidity, distance, seismic data, and/or other sensed information to trigger, modify, and/or update emergency station functions.

3. Emergency Station Computer System

Figure 3A:
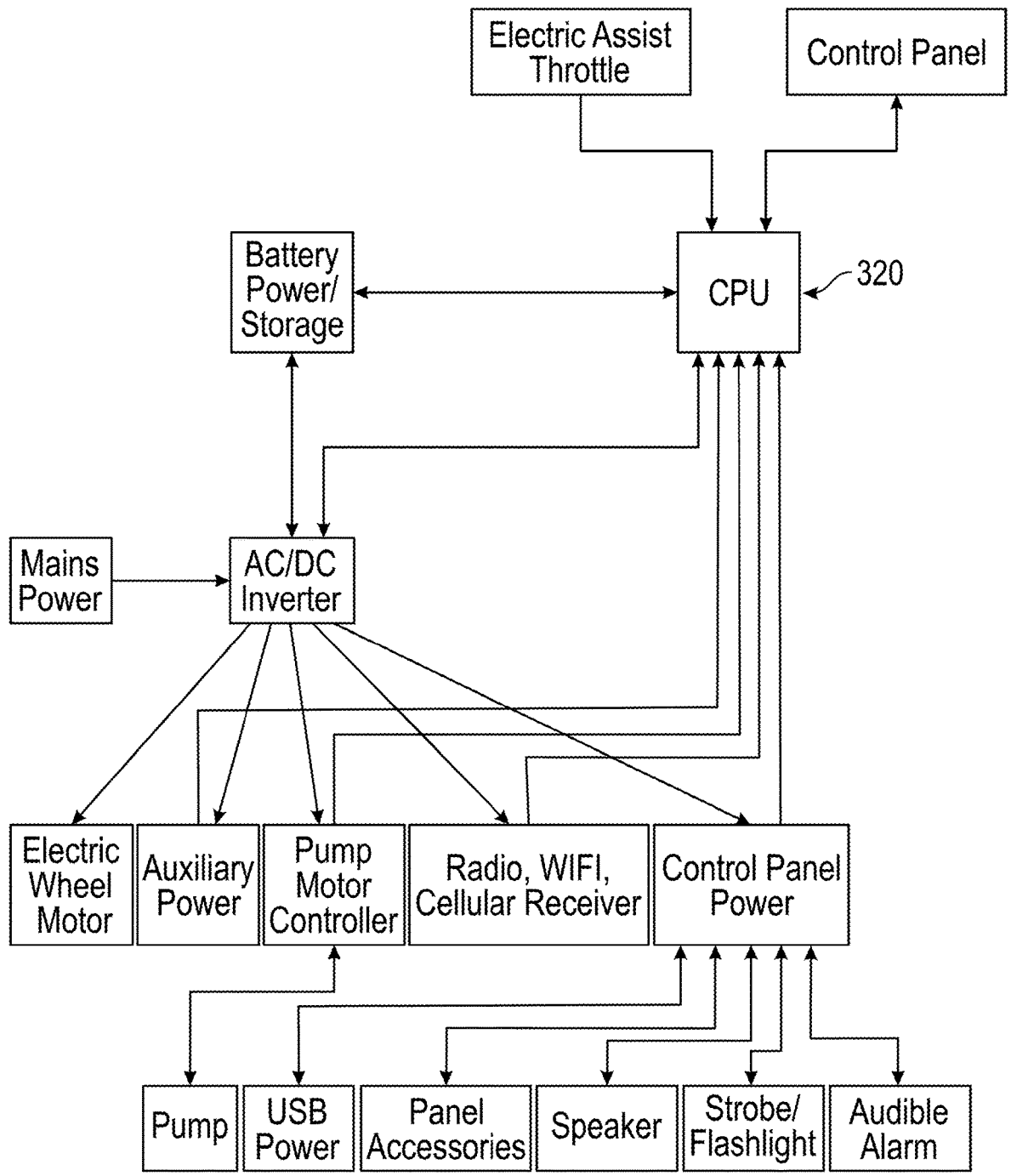
FIG. 3A is schematic illustrating exemplary electrical power command relationships in the electrical system and computer system of the emergency station.

FIG. 3A diagrams the electrical power command relationships in the electrical and computer systems of the emergency station 100.

Figure 3B:
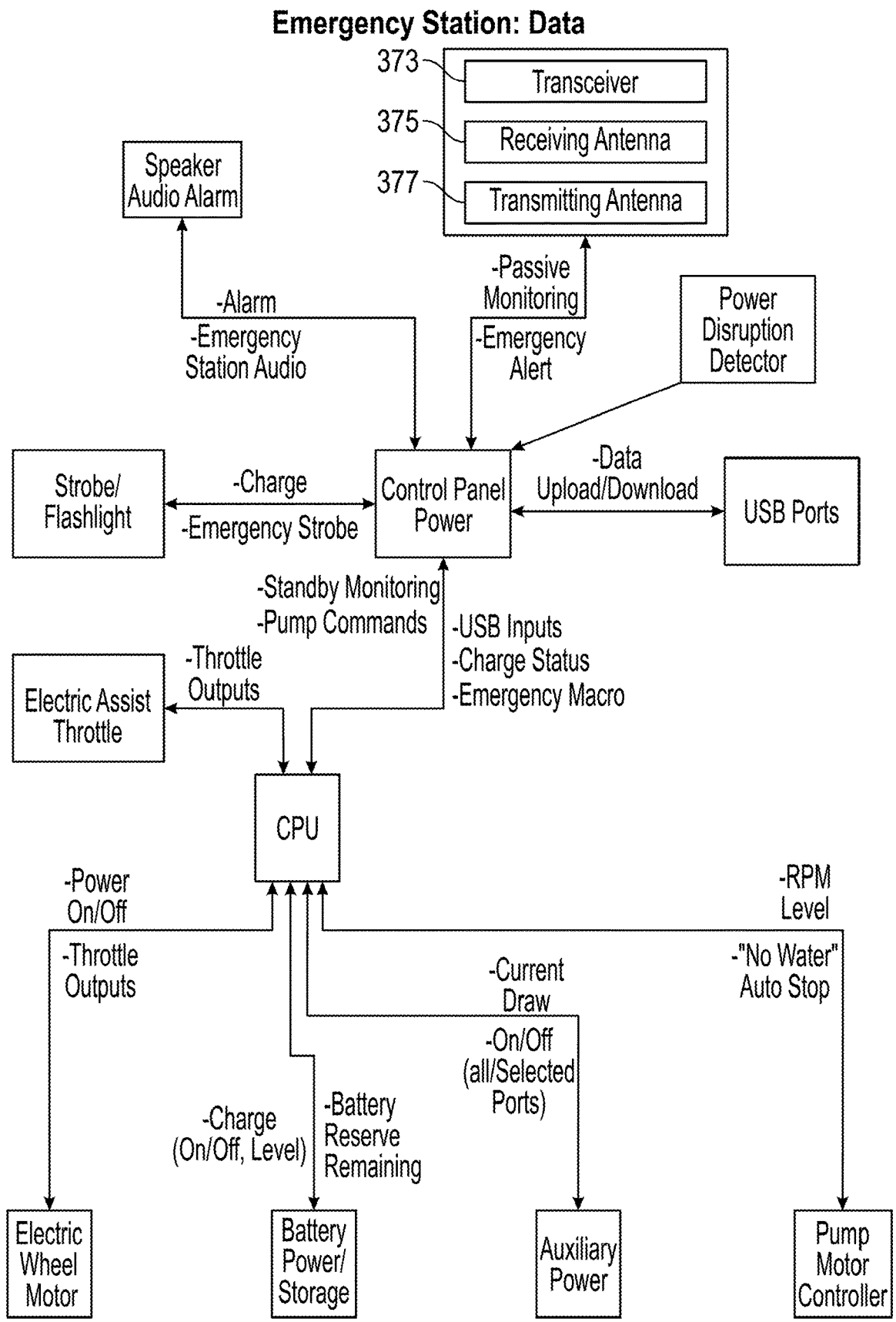
FIG. 3B is schematic illustrating exemplary data command relationships in the electrical system and computer system of the emergency station.

FIG. 3B diagrams data command relationships in the electrical and computer systems of the emergency station 100.

A CPU 320 manages and integrates the emergency station's power, communication and monitoring systems while simultaneously managing control and display systems. Optional cell phone, tablet, and/or computer devices are connected to the emergency station 100 via wireless, Bluetooth, WIFI (through USB Dongle or USB wired ports 370 to augment user controls, monitor emergency signals and/or websites, and/or to control and monitor user-supplied remote drones.

Features of the CPU 320 include one or more of the following:
- monitor internal and external inputs to detect Radio Frequency (RF) and Satellite signals via onboard telescoping 376 or connected external antennae 378, cell phone receiver circuitry or via USB from user supplied wirelessly connected devices,
- monitor presence of AC power input;
- monitor battery power, and enable battery charging (on/off to charge circuit);
- monitor system activity and dynamically calculate remaining battery power, and time remaining at various system states and power loads;
- adjust pump motor power and frequency (and thus output PSI and GPM) by means of selectable user adjustable input via a rotating switch 314 (FIG. 4);
- automatically adjust pump controller motor input power and frequency (and thus output PSI and GPM) by means of real-time calculations from remaining battery power to determine desired remaining time of use;
- dynamically calculate battery life, remaining liquid volume, and pump flow rates;
- send and receive data via USB ports or other common data interfaces;
- convert modulated information from onboard and external antenna to drive audible information via a speaker;
- manage LED indicators and display content (LCD or segmented);
- enable continuous monitoring of radio, WIFI, G5, satellite, and blue tooth signals to modify protocols and responses using machine learning, AI and IOT in combination with optional outboard sensors and remote user input.

4. Emergency Station Users Control/Display and Monitoring Systems

Figure 4:
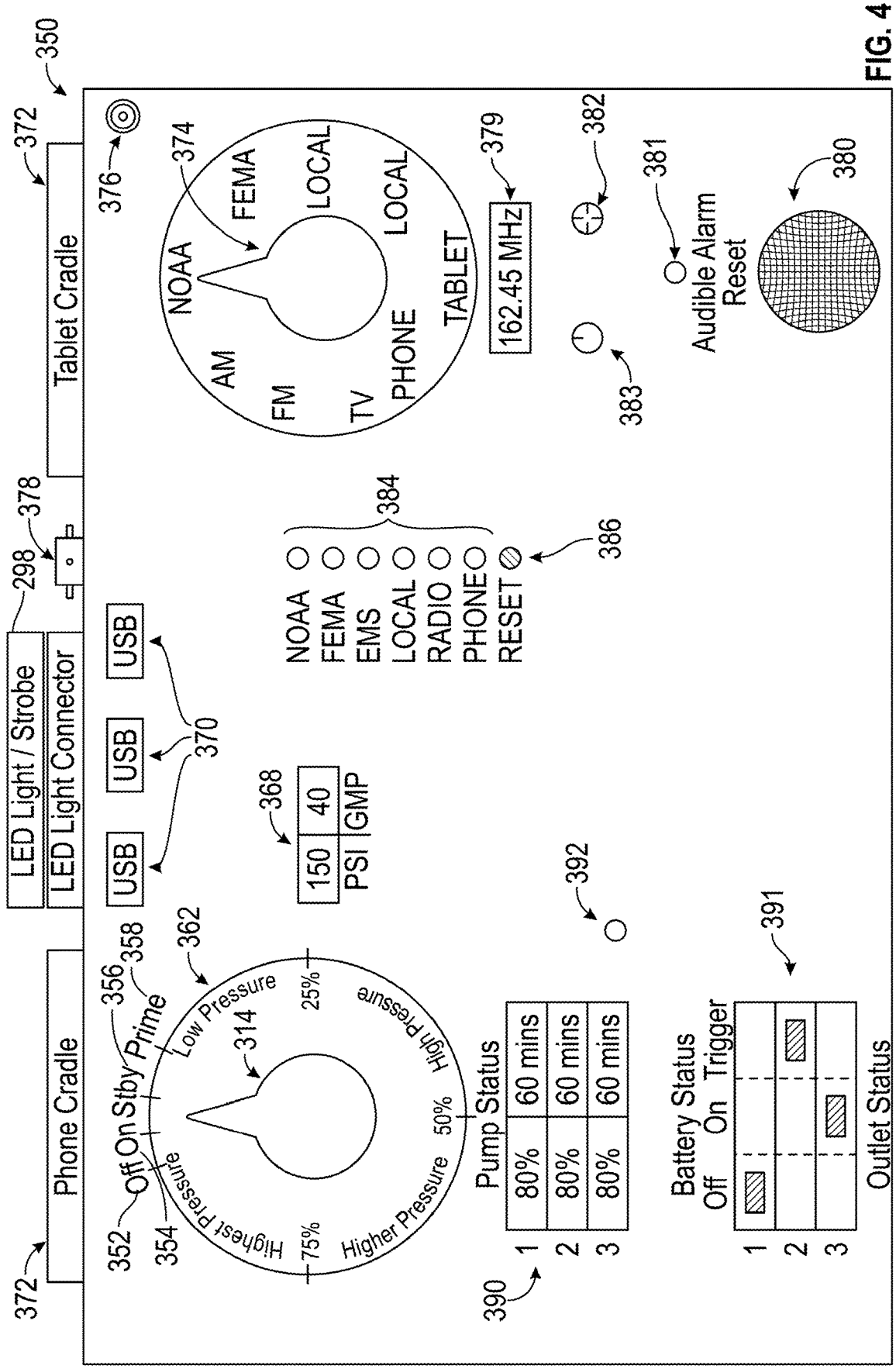
FIG. 4 is a diagram of an embodiment of a user control, interface and monitoring system of the emergency station.

With reference additionally to FIG. 4, a user control, interface and monitoring system 350 of the emergency station 100 will be described.

Provided that the emergency station 100 is connected to an outside 120V, 240V, or the like AC power source or onboard charged batteries 130, rotating switch 314 assigns various tasks to assorted emergency station systems.

A first switch position 352 is OFF. This disconnects all emergency station systems from internal and external electrical power.

A second switch position 354 is ON. This powers the emergency station electrical systems to supply to onboard AC connectors/outlets 306, drive wheel electric motor 112, and user control and display panel 290.

A third switch position 356 is STANDBY. This configures the emergency station 100 to monitor outside radio, WIFI, and phone signals whose presence may trigger user preset functions including, but not limited to, topping off of battery charging, activation of pump 120 at user predetermined rates as well as controlling and monitoring onboard AC connectors/outlets 306.

A fourth position 358, PRIME, will turn on power to all emergency station systems, engage the ultra-capacitor(s) 140 and provide for priming of the pump system 120 by sending preassigned frequency and amperage rates to electric pump motor controller 360.

When the switch is in this position, no electrical power will flow to the AC connectors/outlets 306.

In a fifth position 362, VARIABLE PRESSURE, will turn on power to all emergency station systems and allow the user to manually control the liquid pressure from low to high by sending various currents and frequency rates to the electric pump motor controller 360. When the switch is in this position, no electrical power will flow to the AC connectors/outlets 306. A feedback circuit from pump valves 364 will not allow pressure to exceed 80 PSI when either low-pressure hose coupling adapters 366 are detected. An accompanying display 368 will indicate liquid pressure (in pounds per square inch) and flow (in gallons per minute).

The emergency station 100 may also be activated manually or remotely by phone, radio, satellite, or WIFI signal to perform assorted user-defined tasks. The emergency station 100 may initiate real-time wired and/or wireless signaling to owner, home or business automation systems, emergency services, insurance company or alarm company interfaces to continuously update data on status of emergency. The emergency station 100 may also enable ongoing, two-way communication with owner or designees to monitor and/or control station activities. The emergency station 100 may also transmit at least one of wireless signaling, wire-based signaling, and/or battery power to user determined outboard equipment 369 (FIG. 3B) such as, but not limited to pumps, lights, alarms, an automatic transfer switch, medical devices, and heaters, transponder(s), transmitter(s), generator(s), alarm(s) via WIFI, G5, RF, satellite, etc. to activate user pre-selected functions. Still further, the emergency station 100 may also transmit wired signals to the user determined outboard equipment 369 to activate user pre-selected functions.

In addition, the emergency station 100 may be user programmed and configured to connect with optional tablet, phone and/or computers wirelessly or through USB ports 370 to link with optional applications which can supply geolocation and telemetry status, amongst others. Cradles 372 to physically support optional phones or tablets will be located above the user control and display panel 290.

In the event of a fire or flood situation, the emergency station 100 may be deployed to transfer liquid at variable rates and pressures. In addition, the emergency station 100 may provide AC power supply, emergency monitoring and user defined feature activation for flood mitigation.

A rotating switch 374 will be assigned to monitor assorted emergency and broadcast bands which can be fine-tuned to specific frequencies to monitor real-time notifications and updates. The system's receiver will simultaneously monitor via telescoping antenna 376, internal antennas, and/or an external coax connector 378 and antenna to detect various emergency signals (FEMA, NOAA, Military, local emergency frequencies, broadcasters, private networks, commercial networks, etc.) and trigger assorted user-defined tasks (to fully charge onboard batteries, activate onboard or ancillary visual and/or sonic/audible alarms, power onboard AC outlets, etc.). A display 379 displays information related to the monitored emergency and broadcast band(s). During an emergency, an onboard speaker 380 may provide audio alerts and monitoring from various emergency agencies (FEMA, NOAA, etc.) as well as local television and radio stations. An audible alarm reset (e.g., LED and push switch) 381 resets the audible alarm 300. A speaker volume and on/off control 382 will regulate its output or amplify audio from optionally connected phone or tablet devices. A tune control 383 is used to tune frequency of the monitored emergency and broadcast band(s).

A plurality of LED lights 384 (e.g., six LED lights) indicate which of the alert signals triggered the emergency station. A seventh button 386 in this array will allow the user to reset these indicators.

A plurality of the USB outlets 370 (e.g., three USB outlets) are mounted on the user control and display panel 290 to provide power and data transfer between the station and other assorted user-supplied equipment such as mobile phones, computers and tablets. Such optional equipment offers users setup support, additional displays and control options and an interface for system software and firmware updates.

One or more indicator(s) 390 display the charge status of the one or more rechargeable batteries including the percentage of charge and the remaining running time (in minutes) for each battery 130 based on real-time current draw. One or more indicator(s) 391 display the status of the AC outlets 306. Additionally, an LED indicator/recharge switch 392 indicates the charge status of the ultra-capacitor(s) 140.

5. Emergency Station Liquid Pump System Features

Figure 5:
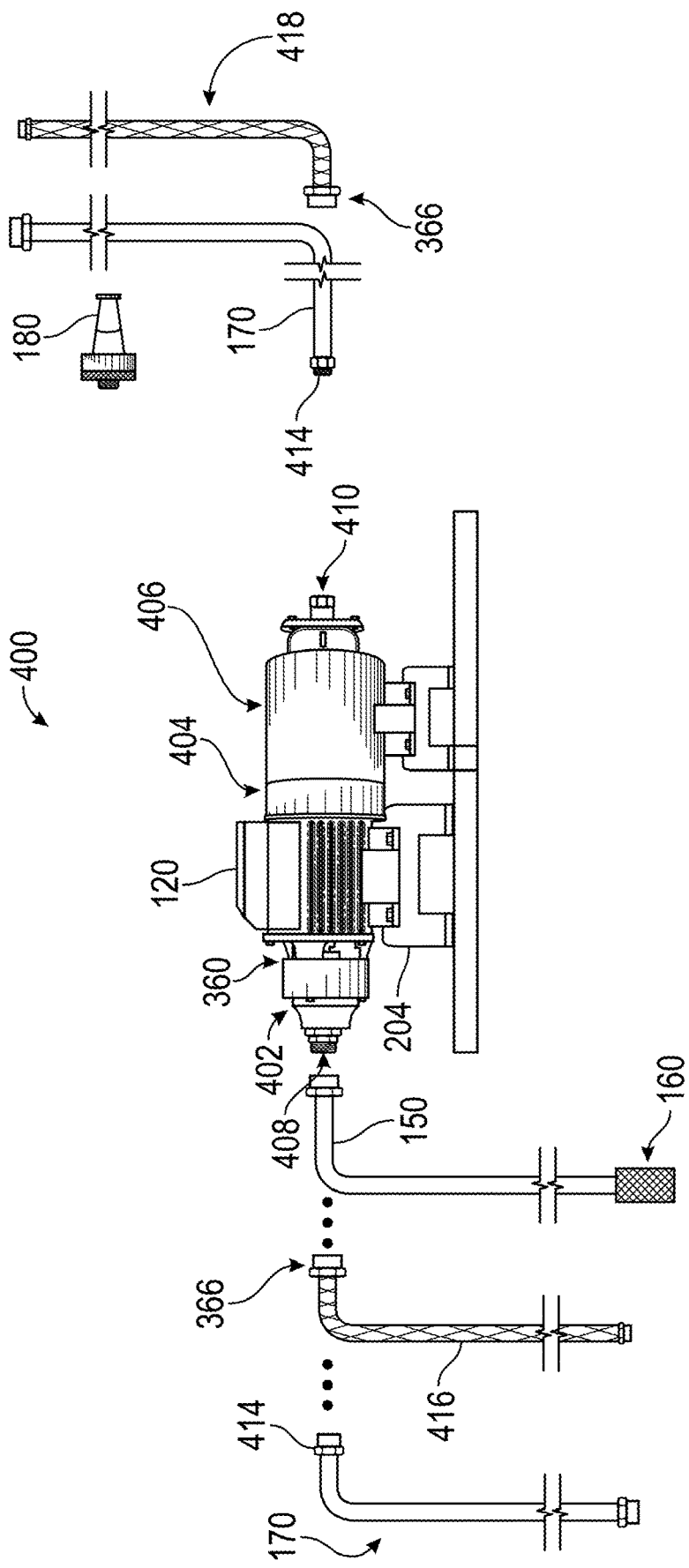
FIG. 5 is a diagram of an embodiment of a variable pressure electric liquid pump system of the emergency station.

With reference additionally to FIG. 5, the emergency station's hydraulic and electro-mechanical systems 400 will be described.

The electric pump/compressor/pressurizer 120 includes a variable speed electric motor 402, an impeller 404, and a diffuser 406.

The system 400 connects at an intake coupler 408 (e.g., 2 inch intake coupler) to a supplied suction hose 150 (e.g., twenty foot 2-3 inch diameter camlock suction hose) with a filter valve/strainer 160. The system 400 is compatible with standard firehose/linkages 170 and stream or spray nozzle 180 for connection at discharge coupler 410 (e.g., 2" discharge coupler). The system 400 may also connect to supplied standard fire hose 170 with standard 2" coupling 414 to be used for liquid intake and discharge in the event of flooding.

The system 400 may also be connected to supplied reinforced ⅝" diameter hoses 416, 418 via coupling adapters 366 which, at low pressure (30-80 psi), can be placed in-line with a user modified area plumbing or sprinkler systems to boost or provide closed system area water pressure or pressure augmentation. For example, as shown in FIG. 1, the hose 418 may connect the emergency station 100 to one or more high or low power pressure rooftop (e.g., portable or fixed) sprinklers/systems 303 disposed on a rooftop of a structure (e.g., house, building) that are operated to disperse water (or other liquid) to prevent/put out fire. The hose 418 may also connect the emergency station 100 to one or more high or low pressure ground (e.g., portable or fixed) sprinklers/systems 305 disposed in the ground that are operated to disperse water (or other liquid) to prevent/put out fire. The ⅝" hose 416, 418 is connected to the pump's intake and/or discharge coupler(s) 408, 410 via detachable coupling adapter (⅝"-2") 366. When either coupling adapter 366 is detected by the CPU 320, a feedback circuit will prevent the liquid pump 120 from operating at pressures higher than 80 psi. In this mode, the station 100 may additionally function as a power washer.

The emergency station's hydraulic and electro-mechanical systems 400 include one or more of the following features:
  Electric Powered Centrifugal Motor; self-priming with backflow check valve,
  Ability to Create Variable Pressure (nominally 30-200 pounds per square inch),
  Ability to Create Variable Flow (between 50-500 gallons per minute),
  1, 1.5 or 2-inch discharge fitting to standard fire hose or other,
  2-3" suction inlet fitting to camlock "quick connect" suction hose,
  Pump Overhead Lift of up to 100 feet pump to destination at high pressure,
  Ability to charge a Fire Hose Rated length of up to 200 feet at high pressure,
  Pump Suction Head can draft water source up to 25 feet to pump at high pressure,
  Ability to transfer water & liquids such as gels or foams at fire-fighting hose speeds and pressures,
  Liquid pressure detection feature to automatically shut off pump system when liquid supply is exhausted.

The station 100 may be stationary or moved from place to place to optimize liquid sourcing and/or transfer for fire-fighting, water pressure support, flood mitigation or power supply needs. The station 100 may be used to pre-treat structures or vegetation with liquid and/or foams and retardants to delay fire spread. The station 100 may also be used to actively fight fire spread.

Potential liquid sources for the station 100 include, but are not limited to, one or more of the following:
  Home Pool,
  Well,
  Cistern,
  Reservoir or Lake,
  Water Storage Tank,
  Hydrant or other Public Water Source,
  Fire Suppression Gels & Foams,
  Flooded or water compromised and/or damaged locations.

Potential liquid destinations for the station 100 include, but are not limited to, one or more of the following:
  Burning House,
  Burning Structure,
  Burning Trees, Brush, Grass, etc.,
  Dry Tinder, Structures, Trees, Brush, Grass, etc.,
  Rivers, Lakes, Oceans, Water Storage Containers, Land or Ground, etc.

Figure 6:
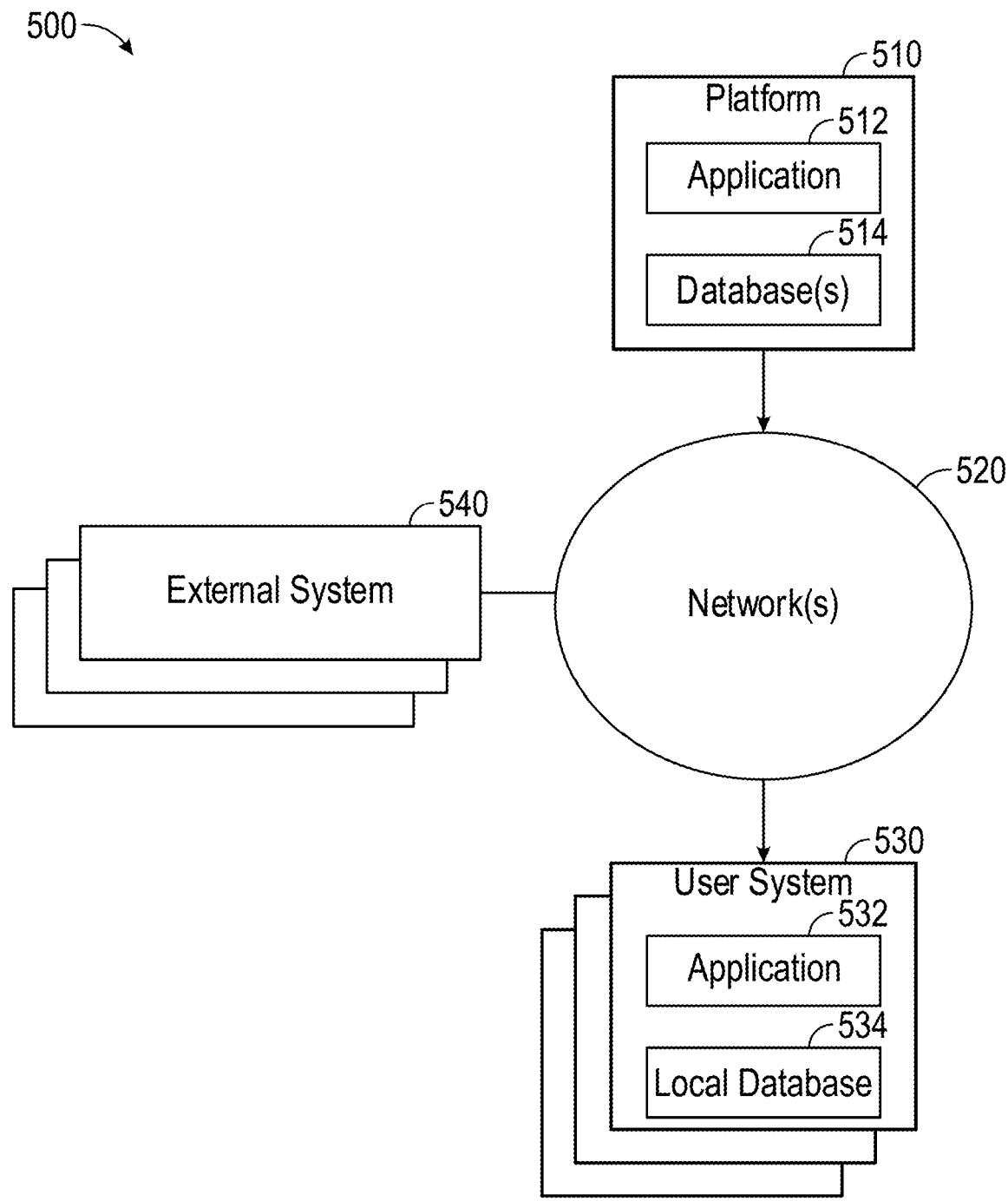
FIG. 6 illustrates an example infrastructure, in which one or more of the processes described herein, may be implemented, according to an embodiment.

With reference to FIG. 6, an example infrastructure, in which one or more of the processes described herein, may be implemented, according to an embodiment, will be described, and, with reference to FIG. 7, an example processing system, by which one or more of the processed described herein, may be executed, according to an embodiment, will be described.

For example, but not by way of limitation, the example infrastructure and/or example processing system may be used with respect to the monitoring and detecting various emergency signals (FEMA, NOAA, Military, local emergency frequencies, broadcasters, private networks, commercial networks, etc.) and trigger assorted user-defined tasks (to fully charge onboard batteries, activate onboard or ancillary visual and/or sonic/audible alarms, power onboard AC outlets, etc.). Further, the example processing system may be used in conjunction with control and/or operation of the various systems shown and/or described herein. Further, but not by way of limitation, the processing system may be used to manage the unit's power supplies; identifying, switching and engaging between AC sources and batteries; recharging drained batteries when connected to an AC power source and/or switching between individual batteries when their respective charges are depleted. The processing system and its components are rated to military and/or high stress (water-proof, high heat and shock resistant standards). Further, the example infrastructure and/or example processing system includes multiple emergency stations 100 wirelessly connected to form a useful data and mitigation network. Still further, the example infrastructure and/or example processing system enables continuous monitoring of radio, WIFI, G5, satellite, and blue tooth signals to modify protocols and responses using machine learning, AI and IOT in combination with optional outboard sensors and remote user input. As governmental, military, commercial, private and insurance company wireless emergency signals are further refined, command activities from the emergency station 100 are made more specific. Using AI, machine learning and IOT, the station's processor(s) 320, 610 continuously monitor verify, authenticate and correct incoming signals in order to modify, error correct and update station actions and protocols. Still further, the example infrastructure and/or example processing system enables the emergency station 100 to transmit signals wirelessly to user determined outboard equipment 369 (FIG. 3B) via WIFI, G5, RF, satellite, etc. to activate user pre-selected functions. The activated user pre-selected functions may be automatically activated/triggered as a user-defined task upon detection of the various emergency signals (FEMA, NOAA, Military, local emergency frequencies, broadcasters, private networks, commercial networks, etc.).

System Overview

Infrastructure

FIG. 6 illustrates an example system 500 that may be used, for example, but not by way of limitation, for monitoring and detecting various emergency signals and triggering assorted user-defined tasks, according to an embodiment. The infrastructure may comprise a platform 510 (e.g., one or more servers) which hosts and/or executes one or more of the various functions, processes, methods, and/or software modules described herein. Platform 510 may comprise dedicated servers, or may instead comprise cloud instances, which utilize shared resources of one or more servers. These servers or cloud instances may be collocated and/or geographically distributed. Platform 510 may also comprise or be communicatively connected to a server application 512 and/or one or more databases 514. In addition, platform 510 may be communicatively connected to one or more user systems 530 via one or more networks 520. Platform 510 may also be communicatively connected to one or more external systems 540 (e.g., other platforms, websites, etc.) via one or more networks 520.

Network(s) 520 may comprise the Internet, and platform 510 may communicate with user system(s) 530 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 520, it should be understood that platform 510 may be connected to the various systems via different sets of one or more networks. For example, platform 510 may be connected to a subset of user systems 530 and/or external systems 540 via the Internet, but may be connected to one or more other user systems 530 and/or external systems 540 via an intranet. Furthermore, while only a few user systems 130 and external systems 540, one server application 512, and one set of database(s) 514 are illustrated, it should be understood that the infrastructure may comprise any number of user systems, external systems, server applications, and databases.

User system(s) 530 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, Automated Teller Machines, and/or the like.

Platform 510 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 510 transmits or serves one or more screens of the graphical user interface in response to requests from user system(s) 530. In some embodiments, these screens may be served in the form of a wizard, in which case two or more screens may be served in a sequential manner, and one or more of the sequential screens may depend on an interaction of the user or user system 530 with one or more preceding screens. The requests to platform 510 and the responses from platform 510, including the screens of the graphical user interface, may both be communicated through network(s) 520, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 514) that are locally and/or remotely accessible to platform 510. Platform 510 may also respond to other requests from user system(s) 530.

Platform 510 may further comprise, be communicatively coupled with, or otherwise have access to one or more database(s) 514. For example, platform 510 may comprise one or more database servers which manage one or more databases 514. A user system 530 or server application 512 executing on platform 510 may submit data (e.g., user data, form data, etc.) to be stored in database(s) 514, and/or request access to data stored in database(s) 514. Any suitable database may be utilized, including without limitation MySQL™, Oracle™, IBM™, Microsoft SQL™, Access™, and the like, including cloud-based databases and proprietary databases. Data may be sent to platform 510, for instance, using the well-known POST request supported by HTTP, via FTP, and/or the like. This data, as well as other requests, may be handled, for example, by server-side web technology, such as a servlet or other software module (e.g., comprised in server application 512), executed by platform 510.

In embodiments in which a web service is provided, platform 510 may receive requests from external system(s) 540, and provide responses in eXtensible Markup Language (XML), JavaScript Object Notation (JSON), and/or any other suitable or desired format. In such embodiments, platform 510 may provide an application programming interface (API) which defines the manner in which user system(s) 530 and/or external system(s) 540 may interact with the web service. Thus, user system(s) 530 and/or external system(s) 540 (which may themselves be servers), can define their own user interfaces, and rely on the web service to implement or otherwise provide the backend processes, methods, functionality, storage, and/or the like, described herein. For example, in such an embodiment, a client application 532 executing on one or more user system(s) 530 may interact with a server application 512 executing on platform 510 to execute one or more or a portion of one or more of the various functions, processes, methods, and/or software modules described herein. Client application 532 may be "thin," in which case processing is primarily carried out server-side by server application 512 on platform 510. A basic example of a thin client application is a browser application, which simply requests, receives, and renders webpages at user system(s) 530, while the server application on platform 510 is responsible for generating the webpages and managing database functions. Alternatively, the client application may be "thick," in which case processing is primarily carried out client-side by user system(s) 530. It should be understood that client application 532 may perform an amount of processing, relative to server application 512 on platform 510, at any point along this spectrum between "thin" and "thick," depending on the design goals of the particular implementation. In any case, the application described herein, which may wholly reside on either platform 510 (e.g., in which case server application 512 performs all processing) or user system(s) 530 (e.g., in which case client application 532 performs all processing) or be distributed between platform 510 and user system(s) 530 (e.g., in which case server application 512 and client application 532 both perform processing), can comprise one or more executable software modules that implement one or more of the functions, processes, or methods of the application described herein.

Example Processing Device

Figure 7:
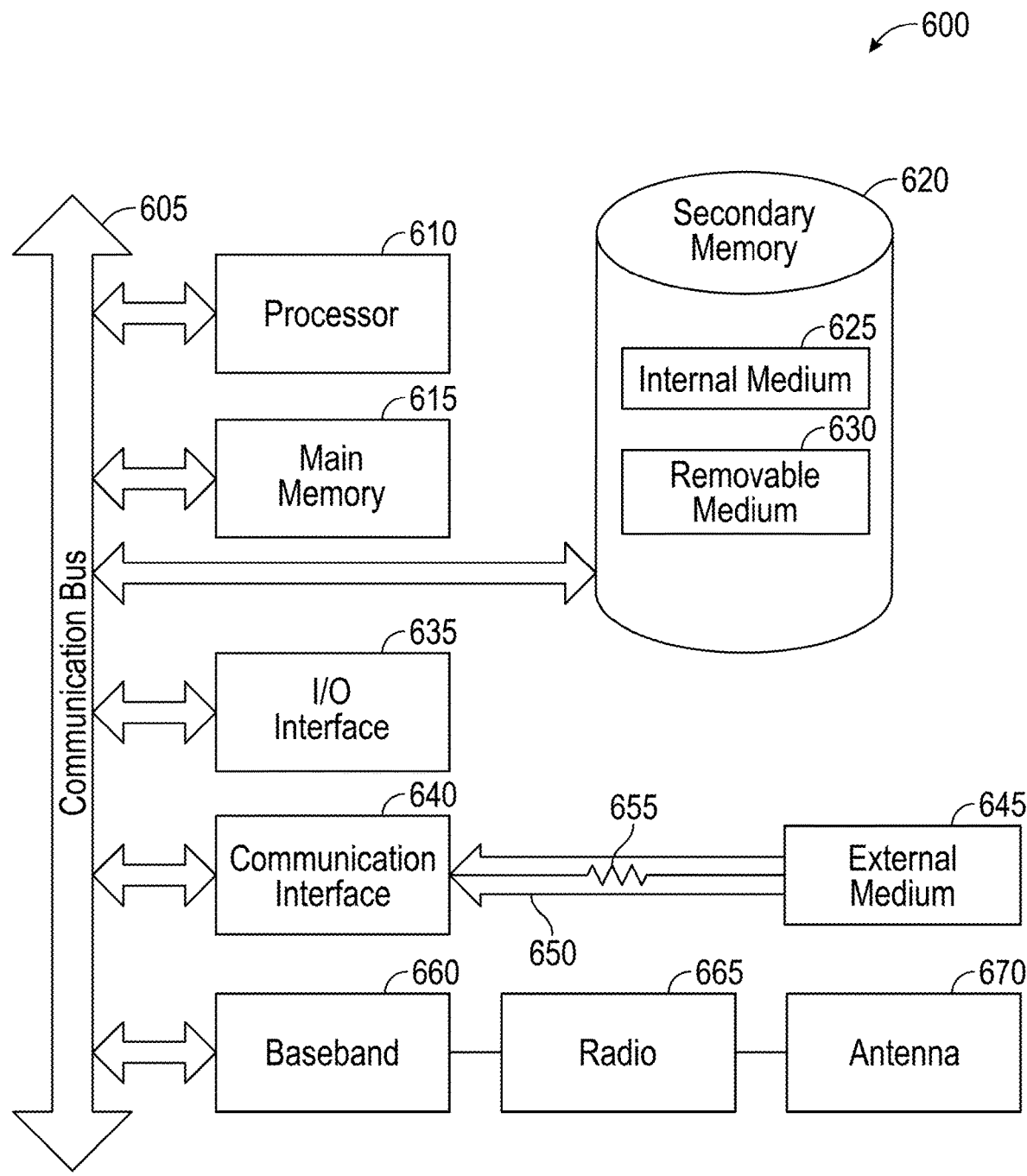
FIG. 7 illustrates an example processing system, by which one or more of the processed described herein, may be executed, according to an embodiment.

FIG. 7 is a block diagram illustrating an example wired or wireless system 600 that may be used in connection with various embodiments described herein and may include one or more of the features of the satellite device 2200 described further below with respect to FIG. 14, which is incorporated herein. For example, system 600 may be used as or in conjunction with one or more of the functions, processes, or methods (e.g., to store and/or execute the application or one or more software modules of the application) described herein, and may represent components of platform 510, user system(s) 530, external system(s) 540, and/or other processing devices described herein. System 600 can be a server or any conventional personal computer, or any other processor-enabled device that is capable of wired or wireless data communication. Other computer systems and/or architectures may be also used, as will be clear to those skilled in the art.

System 600 preferably includes one or more processors, such as processor 610. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 610. Examples of processors which may be used with system 600 include, without limitation, the Pentium® processor, Core i7® processor, and Xeon® processor, all of which are available from Intel Corporation of Santa Clara, Calif.

Processor 610 is preferably connected to a communication bus 605. Communication bus 605 may include a data channel for facilitating information transfer between storage and other peripheral components of system 600. Furthermore, communication bus 605 may provide a set of signals used for communication with processor 610, including a data bus, address bus, and/or control bus (not shown). Communication bus 605 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 600 preferably includes a main memory 615 and may also include a secondary memory 620. Main memory 615 provides storage of instructions and data for programs executing on processor 610, such as one or more of the functions and/or modules discussed herein. It should be understood that programs stored in the memory and executed by processor 610 may be written and/or compiled according to any suitable language, including without limitation C/C++, Java, JavaScript, Perl, Visual Basic, .NET, and the like. Main memory 615 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 620 may optionally include an internal medium 625 and/or a removable medium 630. Removable medium 630 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 620 is a non-transitory computer-readable medium having computer-executable code (e.g., disclosed software modules) and/or other data stored thereon. The computer software or data stored on secondary memory 620 is read into main memory 615 for execution by processor 610.

In alternative embodiments, secondary memory 620 may include other similar means for allowing computer programs or other data or instructions to be loaded into system 600. Such means may include, for example, a communication interface 640, which allows software and data to be transferred from external storage medium 645 to system 600. Examples of external storage medium 645 may include an external hard disk drive, an external optical drive, flash memory, an external magneto-optical drive, and/or the like. Other examples of secondary memory 620 may include semiconductor-based memory, such as programmable read-only memory (PROM), erasable programmable read-only memory (EPROM), electrically erasable read-only memory (EEPROM), and flash memory (block-oriented memory similar to EEPROM).

Memory 615, 620 may store data related to insight into emergency progress and/or situation status data, which could be used as a research tool.

As mentioned above, system 600 may include a communication interface 640. Communication interface 640 allows software and data to be transferred between system 600 and external devices (e.g. printers), networks, or other information sources. For example, computer software or executable code may be transferred to system 600 from a network server (e.g., platform 510) via communication interface 640. Examples of communication interface 640 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 600 with a network (e.g., network(s) 520) or another computing device. Communication interface 640 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 640 are generally in the form of electrical communication signals 655. These signals 655 may be provided to communication interface 640 via a communication channel 650. In an embodiment, communication channel 650 may be a wired or wireless network (e.g., network(s) 520), or any variety of other communication links. Communication channel 650 carries signals 655 and can be implemented using a variety of wired or wireless communication means including wire or cable, fiber optics, conventional phone line, cellular phone link, wireless data communication link, radio frequency ("RF") link, or infrared link, satellite link, just to name a few.

Computer-executable code (e.g., computer programs, such as the disclosed application, or software modules) is stored in main memory 615 and/or secondary memory 620. Computer programs can also be received via communication interface 640 and stored in main memory 615 and/or secondary memory 620. Such computer programs, when executed, enable system 600 to perform the various functions of the disclosed embodiments as described elsewhere herein.

In this description, the term "computer-readable medium" is used to refer to any non-transitory computer-readable storage media used to provide computer-executable code and/or other data to or within system 600. Examples of such media include main memory 615, secondary memory 620 (including internal memory 625, removable medium 630, and external storage medium 645), and any peripheral device communicatively coupled with communication interface 640 (including a network information server or other network device). These non-transitory computer-readable media are means for providing executable code, programming instructions, software, and/or other data to system 600.

In an embodiment that is implemented using software, the software may be stored on a computer-readable medium and loaded into system 600 by way of removable medium 630, I/O interface 635, or communication interface 640. In such an embodiment, the software is loaded into system 600 in the form of electrical communication signals 655. The software, when executed by processor 610, preferably causes processor 610 to perform one or more of the processes and functions described elsewhere herein.

In an embodiment, I/O interface 635 provides an interface between one or more components of system 600 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 600 may also include one or more optional wireless communication components that facilitate wireless communication over a voice network and/or a data network (e.g., in the case of user system 530). The wireless communication components comprise an antenna system 670, a radio/satellite system 665, and a baseband system 660. In system 600, radio frequency (RF) and/or Satellite signals are transmitted and received over the air by antenna system 670 under the management of radio/satellite system 665.

In an embodiment, antenna system 670 may comprise one or more antennae and one or more multiplexors (not shown) that perform a switching function to provide antenna system 670 with transmit and receive signal paths. In the receive path, received RF and/or Satellite signals can be coupled from a multiplexor to a low noise amplifier (not shown) that amplifies the received RF and/or Satellite signal and sends the amplified signal to radio/satellite system 665.

In an alternative embodiment, radio system 665 may comprise one or more radios that are configured to communicate over various frequencies. In an embodiment, radio system 665 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 665 to baseband system 660.

If the received signal contains audio information, then baseband system 660 decodes the signal and converts it to an analog signal. Then the signal is amplified and sent to a speaker. Baseband system 660 also receives analog audio signals from a microphone. These analog audio signals are converted to digital signals and encoded by baseband system 660. Baseband system 660 also encodes the digital signals for transmission and generates a baseband transmit audio signal that is routed to the modulator portion of radio system 665. The modulator mixes the baseband transmit audio signal with an RF carrier signal, generating an RF transmit signal that is routed to antenna system 670 and may pass through a power amplifier (not shown). The power amplifier amplifies the RF transmit signal and routes it to antenna system 670, where the signal is switched to the antenna port for transmission.

Baseband system 660 is also communicatively coupled with processor 610, which may be a central processing unit (CPU). Processor 210 has access to data storage areas 615 and 620. Processor 610 is preferably configured to execute instructions (i.e., computer programs, such as the disclosed application, or software modules) that can be stored in main memory 615 or secondary memory 620. Computer programs can also be received from baseband processor 660 and stored in main memory 610 or in secondary memory 620, or executed upon receipt. Such computer programs, when executed, enable system 600 to perform the various functions of the disclosed embodiments.

Process Overview

Embodiment(s) of processes for using the emergency station 100 will now be described in detail. It should be understood that the described processes may be embodied in one or more software modules that are executed by one or more hardware processors (e.g., processor 610), e.g., as the application discussed herein (e.g., server application 512, client application 532, and/or a distributed application comprising both server application 512 and client application 532), which may be executed wholly by processor(s) of platform 510, wholly by processor(s) of user system(s) 530, or may be distributed across platform 510 and user system(s) 530, such that some portions or modules of the application are executed by platform 510 and other portions or modules of the application are executed by user system(s) 530. The described processes may be implemented as instructions represented in source code, object code, and/or machine code. These instructions may be executed directly by the hardware processor(s), or alternatively, may be executed by a virtual machine operating between the object code and the hardware processors. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Fire Suppression & Control

Figure 8:
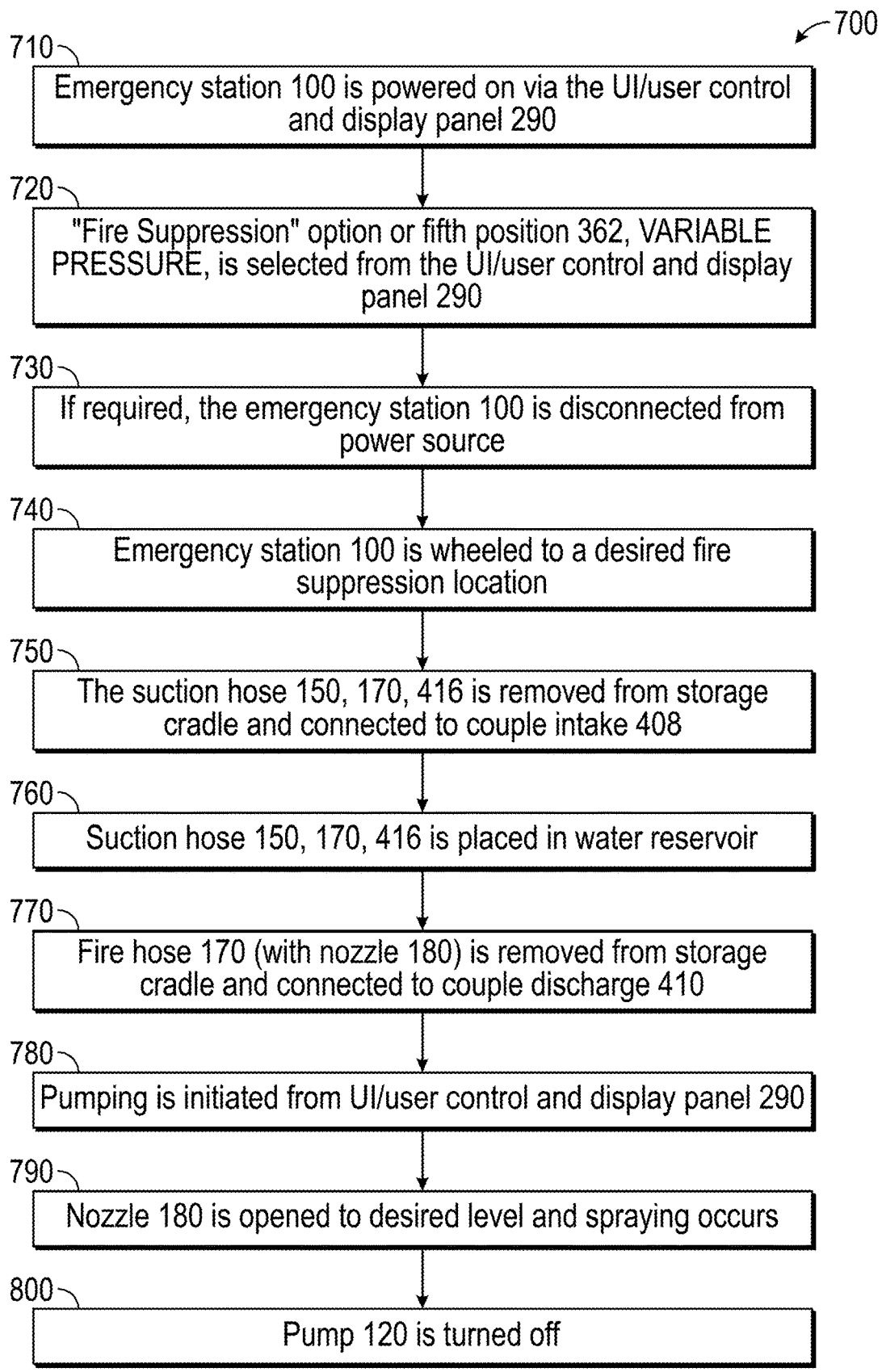
FIG. 8 is a flow chart of an exemplary process for using the emergency station for fire suppression and control.

With reference to FIG. 8, an exemplary application process 700 for using the emergency station 100 is for fire suppression and control. The variable speed capability of the liquid transfer pump provides fire suppression capabilities through high flow/pressure water and/or fire retardant via a high flow fire hose. Water is fed to pump through a suction hose via a static water source (pool, lake, reservoir, tank, etc.). The emergency station 100 is mobile, allowing for movement of the emergency station 100 close enough to the water source to allow insertion of the suction hose.

At step 710, the emergency station 100 is powered on via the UI/user control and display panel 290.

At step 720, the "Fire Suppression" option or fifth position 362, VARIABLE PRESSURE, is selected from the UI/user control and display panel 290. In the fifth position 362, power to all emergency station systems is turned on and the user manually controls the liquid pressure from low to high via the rotating switch 314, sending various currents and frequency rates to the electric pump motor controller 360.

At step 730, if required, the emergency station 100 is disconnected from power source (e.g., AC power source).

At step 740, the emergency station 100 is manually wheeled, which may include actuating the electric motor 112 for the wheels 114, to a desired fire suppression location.

At step 750, the suction hose 150, 170, 416 is removed from storage cradle and connected to suction port or intake coupler 408.

At step 760, the suction hose 150, 170, 416 is placed in water reservoir.

At step 770, the fire hose 170 (with nozzle 180) is removed from storage cradle and connected to discharge coupler 410. The nozzle 180 is verified to be in the off position. A fire retardant adapter is added, if applicable.

At step 780, pumping is initiated from UI/user control and display panel 290 from selected desired pressure (e.g., Highest Pressure), with the UI/user control and display panel 290 continually showing state of charge and time remaining on existing charge based on current usage.

At step 790, the nozzle 180 is opened to desired level and spraying occurs. UI/user control and display panel 290 to continually show state of charge and time remaining on existing charge based on current usage.

At step 800, when complete, pump 120 is turned off by rotating switch 314 to the "Off" position 352. The emergency station 100 may be wheeled back to storage location and turned off.

Flood Control

Figure 9:
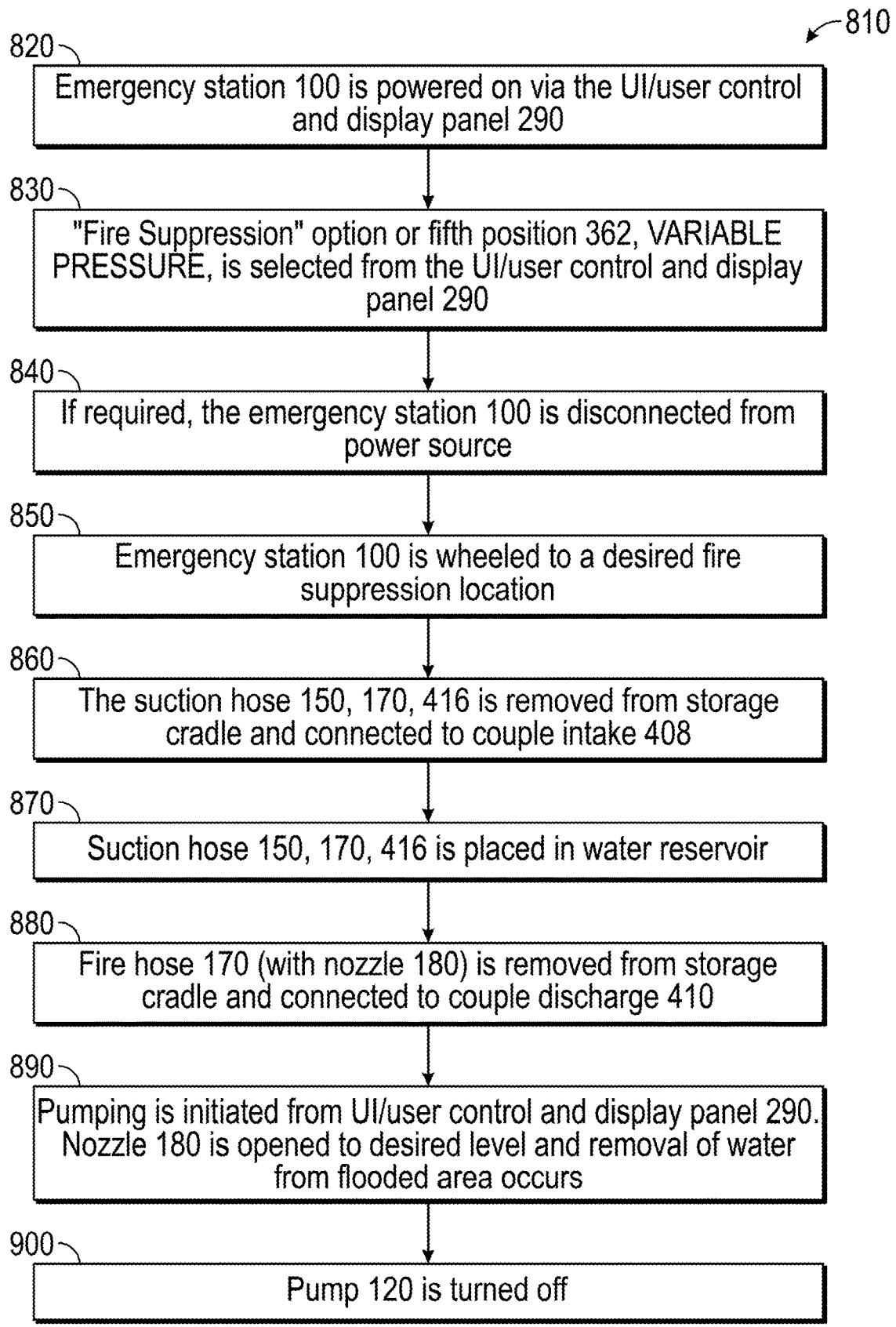
FIG. 9 is a flow chart of an exemplary process for using the emergency station for flood control.

With reference to FIG. 9, an exemplary application process 810 for using the emergency station 100 is for flood control. The emergency station 100 utilizes the fire suppression accessories to mitigate flooding (i.e., suction hose 150, 170, 416 and fire house 140 to remove liquid from flooded area). The suction hose 150, 170, 416 normally used as an inlet hose for fire suppression is used similar to a vacuum hose.

At step 820, the emergency station 100 is powered on via the UI/user control and display panel 290.

At step 830, a "Flood Control" option or fifth position 362, VARIABLE PRESSURE, is selected from the UI/user control and display panel 290. In the fifth position 362, power to all emergency station systems is turned on and the user manually controls the liquid pressure from low to high via the rotating switch 314, sending various currents and frequency rates to the electric pump motor controller 360.

At step 840, if required, the emergency station 100 is disconnected from power source (e.g., AC power source).

At step 850, the emergency station 100 is manually wheeled, which may include actuating the electric motor 112 for the wheels 114, to a desired flood control location.

At step 860, the suction hose 150, 170, 416 is removed from storage cradle and connected to suction port or intake coupler 408.

At step 870, the suction hose 150, 170, 416 is placed in flooded area.

At step 880, the fire hose 170 (with nozzle 180) is removed from storage cradle and connected to discharge coupler 410. The nozzle 180 is verified to be in the off position.

At step 890, pumping is initiated from UI/user control and display panel 290 from selected desired pressure (e.g., Highest Pressure), with the UI/user control and display panel 290 continually showing state of charge and time remaining on existing charge based on current usage. The nozzle 180 is opened to desired level and removal of water from the flooded area occurs. UI/user control and display panel 290 to continually show state of charge and time remaining on existing charge based on current usage.

At step 900, when complete, pump 120 is turned off by rotating switch 314 to the "Off" position 352. The emergency station 100 may be wheeled back to storage location and turned off.

Water Pressure Support and Augmentation

Figure 10:
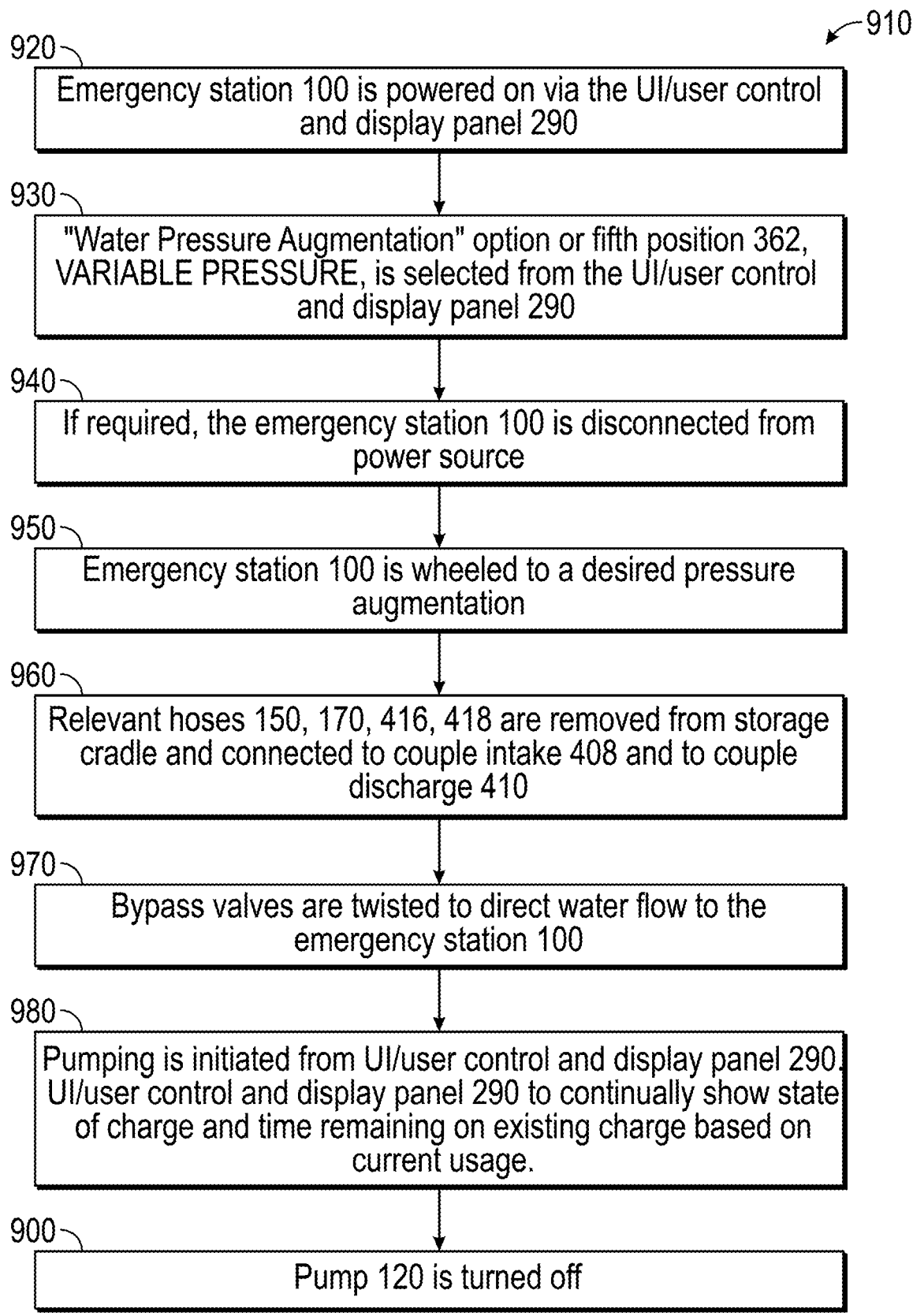
FIG. 10 is a flow chart of an exemplary process for using the emergency station for boosting water pressure of a residence or other facility, in the event of pressure loss.

With reference to FIG. 10, an exemplary application process 910 for using the emergency station 100 is for using the variable speed capability of the liquid transfer pump 120 to boost water pressure of a residence or other facility, in the event of pressure loss. The emergency station 100 also has the ability to automatically sense loss of home water pressure and activate the home pressure boosting feature. For homes with existing booster pumps, the emergency station 100 provide electricity back-up during a power failure (see "Auxiliary Power" feature below). Residential water code stipulates potable water supply pressure to be between 30 psi (minimum) and 80 psi (maximum). Pressure regulators are typically preset to 50 psi from the factory. In the event pressure is reduced/lost (i.e. municipal booster station power loss, fire event, etc.), the emergency station 100 may serve as a "booster pump" to increase water pressure back to desired level.

At step 920, the emergency station 100 is powered on via the UI/user control and display panel 290.

At step 930, a "Water Pressure Augmentation" option, automatic option, or fifth position 362, VARIABLE PRESSURE, is selected from the UI/user control and display panel 290. In the fifth position 362, power to all emergency station systems is turned on and the user manually controls the liquid pressure from low to high via the rotating switch 314, sending various currents and frequency rates to the electric pump motor controller 360.

At step 940, if required, the emergency station 100 is disconnected from power source (e.g., AC power source).

At step 950, the emergency station 100 is manually wheeled, which may include actuating the electric motor 112 for the wheels 114, to a desired pressure augmentation location.

At step 960, the relevant hoses 150, 170, 416, 418 are removed from storage cradle and connected to suction port or intake coupler 408 and to discharge coupler 410.

At step 970, the bypass valves are twisted to direct water flow to the emergency station 100.

At step 980, pumping is initiated from UI/user control and display panel 290 from selected desired pressure (e.g., Highest Pressure), with the UI/user control and display panel 290 continually showing state of charge and time remaining on existing charge based on current usage. UI/user control and display panel 290 to continually show state of charge and time remaining on existing charge based on current usage.

At step 990, when complete, pump 120 is turned off by rotating switch 314 to the "Off" position 352. The emergency station 100 may be wheeled back to storage location and turned off.

Auxiliary Power

Figure 11:
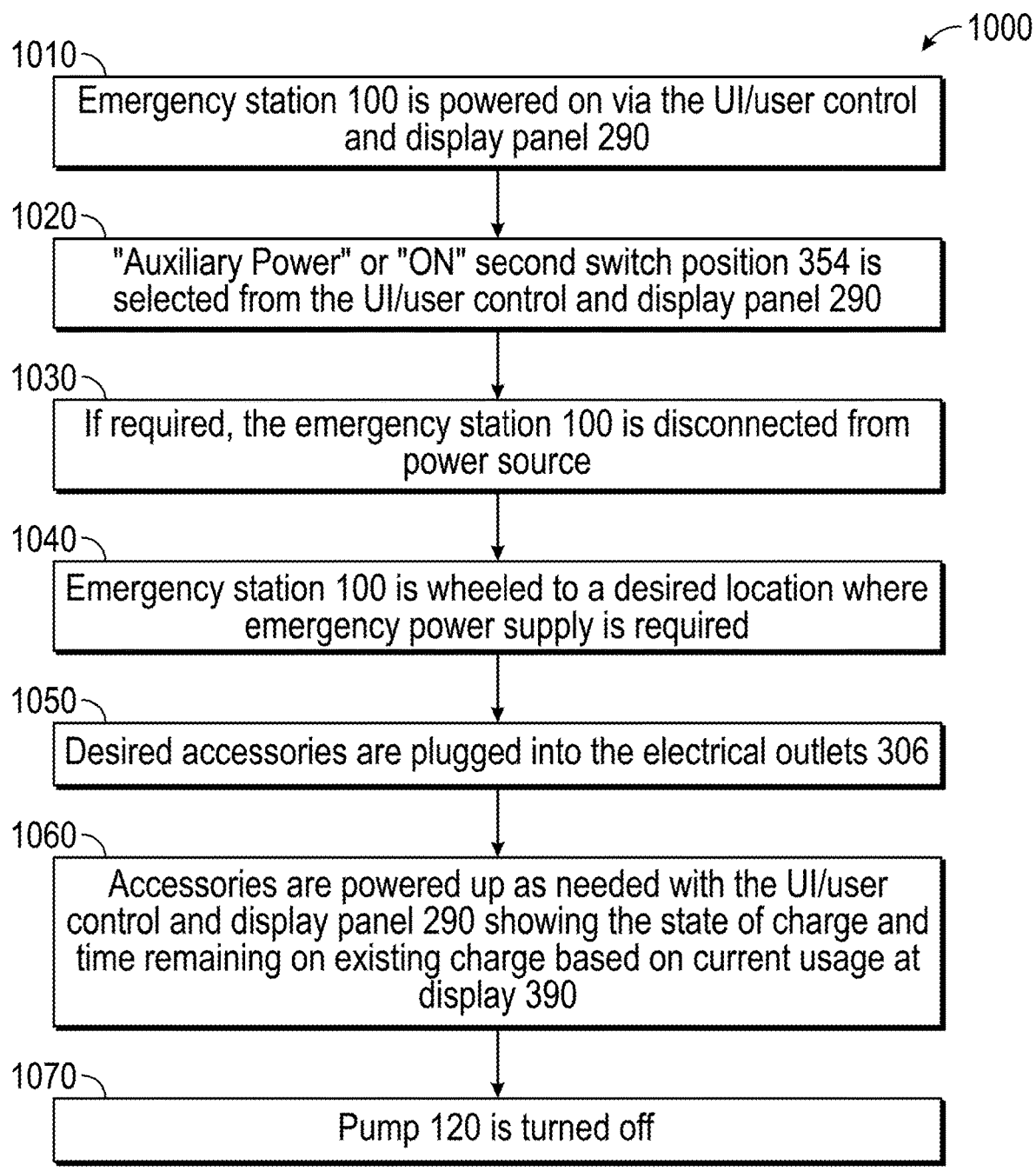
FIG. 11 is a flow chart of an exemplary process for using the emergency station for providing self-contained power for emergency situations, via battery energy storage.

With reference to FIG. 11, an exemplary application process 1000 for using the emergency station 100 is for providing self-contained power for emergency situations, via battery energy storage. The emergency station provides auxiliary power via 120 and/or 240 volt electrical outlets 306 fed by battery storage.

At step 1010, the emergency station 100 is powered on via the UI/user control and display panel 290.

At step 1020, an "Auxiliary Power" or "ON" second switch position 354 is selected from the UI/user control and display panel 290. In the second switch position 354, power is supplied to onboard AC connectors/outlets 306, drive wheel electric motor 112, and user control and display panel 290.

At step 1030, if required, the emergency station 100 is disconnected from power source (e.g., AC power source).

At step 1040, the emergency station 100 is manually wheeled, which may include actuating the electric motor 112 for the wheels 114, to a desired location where emergency power supply is required.

At step 1050, desired accessories are plugged into the electrical outlets 306.

At step 1060, the accessories are powered up as needed with the UI/user control and display panel 290 showing the state of charge and time remaining on existing charge based on current usage at display 390.

At step 1070, when complete, the emergency station 100 is turned off by rotating switch 314 to the "Off" position 352. The emergency station 100 may be wheeled back to storage location and turned off.

Remote Activation and Detection

Figure 12:
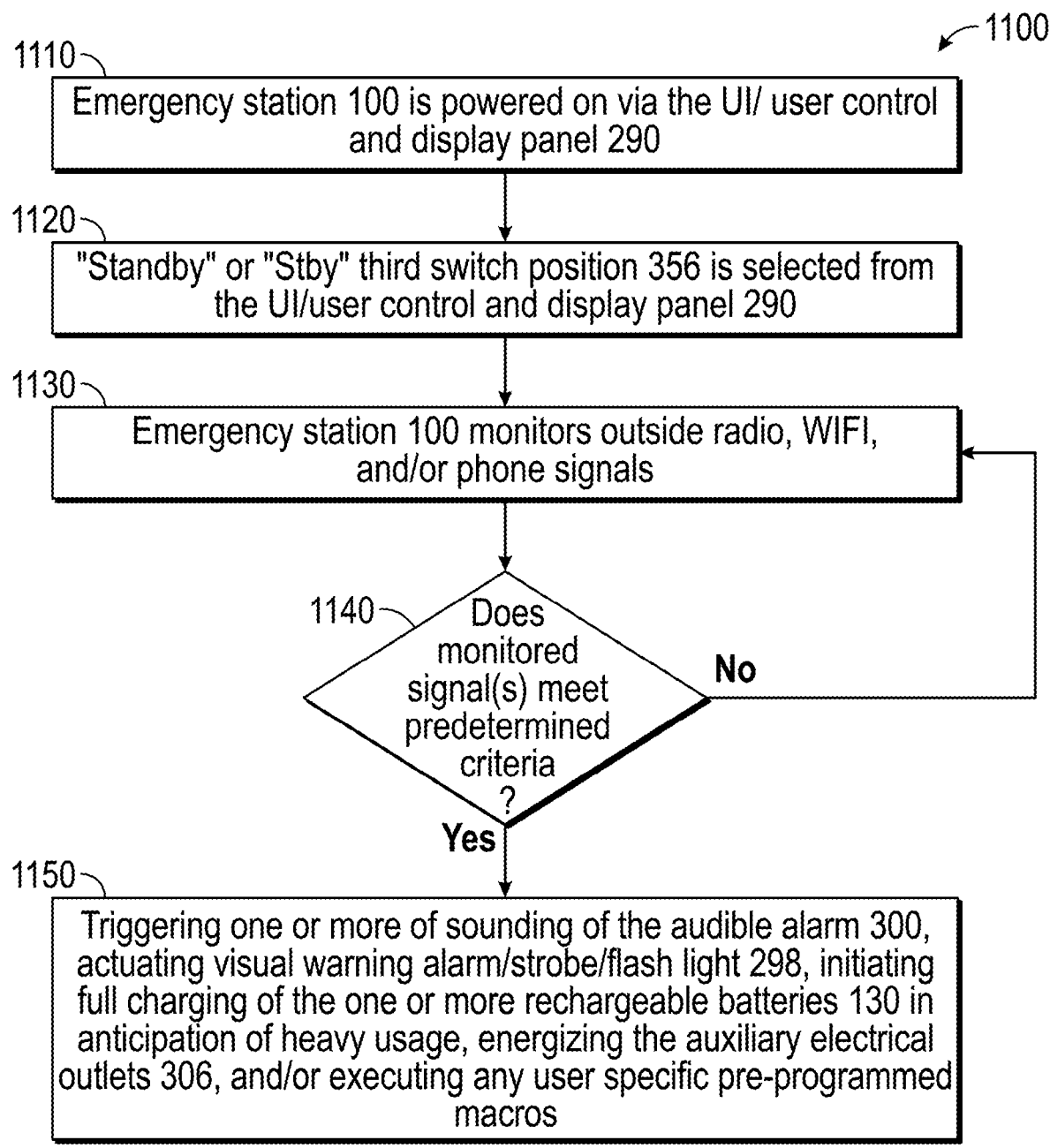
FIG. 12 is a flow chart of an exemplary process for using the emergency station for continually monitoring wireless and/or radio emergency broadcasting and performing automatic functions if alerted.

With reference to FIG. 12, an exemplary application process 1100 for using the emergency station 100 is for continually monitoring wireless, radio, and/or satellite emergency broadcasting and performing automatic functions if alerted. Automatic functions performed include, but are not limited to, sounding of the onboard or ancillary audible alarm 300, actuating the onboard or ancillary visual warning alarm/strobe/flash light 298, initiate full battery charging in anticipation of heavy usage, energize the auxiliary electrical outlets 306, and/or execute any user specific pre-programmed macros.

At step 1110, the emergency station 100 is powered on via the UI/user control and display panel 290.

At step 1120, a "Standby" or "Stby" third switch position 356 is selected from the UI/user control and display panel 290.

In the third switch position 356, at step 1130, the emergency station 100 monitors outside radio, WIFI, and/or phone signals.

At step 1140, the CPU 320 determines whether the monitored signal(s) meet predetermined criteria. If no, then control passes back to step 1130. If yes, then control passes on to step 1150.

At step 1150, the CPU 320 triggers one or more of the following user preset functions: sounding of the onboard or ancillary audible alarm 300, actuating the onboard or ancillary visual warning alarm/strobe/flash light 298, initiating full charging of the one or more rechargeable batteries 130 in anticipation of heavy usage, energizing the auxiliary electrical outlets 306, and/or executing any user specific pre-programmed macros.

In a further implementation, the exemplary application process 1100 and the emergency station 100 may monitor for and alert user and/or trigger one or more of the above/below preset functions for a variety of emergencies such as, but not limited to, home fire, wild fire, earthquake, tornado, hurricane/typhoon, power outage and/or disruption, freezes, severe thunderstorm, flash flooding, tsunami.

In a still further implementation, the exemplary application process 1100 and the emergency station 100 continuously monitor radio, WIFI, G5, satellite, and blue tooth signals to modify protocols and responses using machine learning, AI and IOT in combination with optional outboard sensors and remote user input. As governmental, military, commercial, private and insurance company wireless emergency signals are further refined, command activities from the emergency station 100 are made more specific. Using AI, machine learning and IOT, the station's processor(s) 320, 610 continuously monitor verify, authenticate and correct incoming signals in order to modify, error correct and update station actions and protocols.

In a still further implementation, the exemplary application process 1100 and the emergency station 100 transmit signals wirelessly to user determined outboard equipment 369 (FIG. 3B) via WIFI, G5, RF, satellite, etc. to activate user pre-selected functions. The activated user pre-selected functions may be automatically activated/triggered as a user-defined task upon detection of the various emergency signals (FEMA, NOAA, Military, local emergency frequencies, broadcasters, private networks, commercial networks, etc.).

Satellite Communication System

Figure 13:
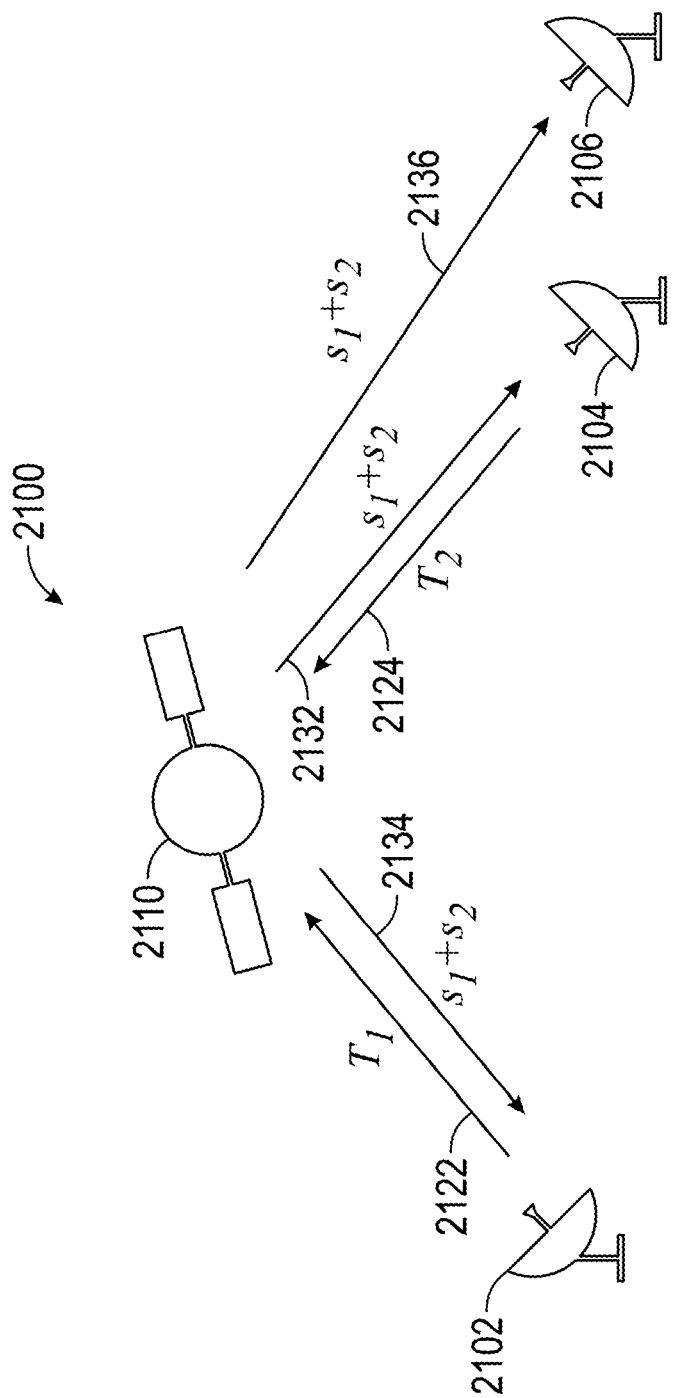
FIG. 13 is graphical depiction of an embodiment of satellite communications between a plurality of ground stations.

FIG. 13 is graphical depiction of an embodiment of satellite communications between a plurality of ground stations. A communication system ("system") 2100 depicts a plurality of ground stations 2102, 2104, 2106 communicating with one another via a satellite 21210. In some embodiments, the communication system 2100 may comprise more than three ground stations 2102, 2104, 2106 and more than one satellite 2110. One or more of the more than three ground stations 2102, 2104, 2106 may be/include the emergency station 100, which for example, as described above, may be remotely triggered and/or controlled (e.g., remotely) by authorized users through satellite signals and/or enable continuous monitoring of satellite signals to perform automatic functions and/or modify protocols and responses using machine learning, AI and IOT, which may be in combination with optional outboard sensors and remote user input.

Some systems may depend upon local copies of the outgoing signals for echo cancellation for interference reduction. In some systems a balanced approach to point-to-point or point-to-multipoint satellite communications may require certain signal processing at both ends of a communications link (e.g., a transmitter-receiver pair). In other systems another, an unbalanced approach may require signal processing only at one site. The communication system 2100 of FIG. 13 is an example of an unbalanced approach in which the ground station 2106 does not have a local copy of transmitted signals, as described below.

The ground station 2102 may transmit a signal 2122 ($T_1$) to the satellite 2110 that is then relayed to the ground stations 2104, 2106. The ground station 2104 may transmit a signal 2124 ($T_2$) to the satellite 2110 that is relayed to the ground station 2102 and the ground station 2106. The ground station 2102 may receive the signal 2124 ($T_2$) and an echo of its own transmitted signal 2122 ($T_1$) as a composite signal 2134 (shown as, $S_1+S_2$). Similarly, the ground station 2104 may receive the signal 2122 ($T_1$) and an echo of its own transmitted signal 2124 ($T_2$) as a composite signal 2132 (shown as, $S_1+S_2$). As used in FIG. 13, the "T" indicates a transmitted signal while the "S" indicates a corresponding signal received at one or more of the ground stations 2102, 2104, 2106. The "$S_1$" and "$S_2$" may also refer to constituent signals of a composite signal (e.g., the composite signals 2132, 2134, 2136).

In some embodiments, both of the ground stations 2102, 2104 may have a local copy of the transmitted signals 2122, 2124 to use in echo cancellation. In some cases, the removal of the self-interfering transmitted signal is accomplished using a process such as echo cancellation. In such an embodiment, the "echo" may be provided by sampling the transmit signal 2122, 2124, processing this signal through a delay line (not shown), matching phase and gain of the incoming composite signal 2132, 2134 and cancelling the transmitted signal within the downlink signal to extract the additional signal within the processed frequency space. The echo cancelation may provide certain levels of interference reduction within the communication system 2100 such that they may be able to receive and successfully demodulate the signal 2122 and the signal 2124 respectively.

The ground station 2106 on the other hand does not transmit a signal of its own and thus may not have any significant echo cancelation capabilities for reception and processing of the signal 2122 ($S_1$) and the signal 2124 ($S_2$). The signal 2122 ($S_1$) and the signal 2124 ($S_2$) together, as received by the ground station 2106, is designated composite signal 2136. The composite signal 2136 may be similar to the composite signal 2132 and the composite signal 2134, being a combination of two signals, $S_1+S_2$. In some embodiments, either or both of the signal 2122 and the signal 2124 can be signals of interest for the ground station 2106.

The composite signal 2136 may however be subject to different forms and levels of interference due to different operating environments. In some embodiments the composite signals 2132, 2134, 2136 may further include varying amounts of interference in addition to echo interference. In other embodiments, the one or more signals 2122, 2124 found within the composite signals 2132, 2134, 2136 may also be referred to herein as constituent signals. Two modulated signals transmitted together may also be considered an additional modulation. Thus, for example, the signal 2122 and the signal 2124 may be referred to as constituent signals of the composite signal 2136.

In some embodiments, a signal of interest (e.g., the signal 2122 or the signal 2124) can be characterized can be canceled from the composite signal 2136, for example, leaving a noise floor. The noise floor as used herein may generally refer to the measure of the signal created or regenerated from the sum of all the noise sources and unwanted signals within a measurement system, where noise is defined as any signal other than the one being monitored. The noise floor can describe a residual signal or remaining noise after the signal of interest (e.g., the signal 2122, 2124) is removed from the composite signal 2136.

In some embodiments, the noise floor may not be characterized. Accordingly, the canceling signal that has been created can be combined in a feed-forward loop with a copy of the composite signal, while compensating for frequency and amplitude variations, to reduce the noise floor. This may result in a higher signal-to-noise (SNR) ratio for the signal of interest. This can increase the potential data throughput of the signal by allowing the use of higher-order modulation schemes, and thus increase the throughput of the entire satellite 2110.

In some embodiments, in order to maximize the use of the available frequency spectra, the signal 2122 and the signal 2124 may use the same or similar bandwidth. In some embodiments, the signal 2122 and the signal 2124 may have the same amplitude. In some other embodiments, the signal 2122 and the signal 2124 may differ slightly in one or more of bandwidth, phase, and amplitude. Accordingly, the ground stations 2102, 2104 may accidentally or intentionally utilize similar frequencies, bandwidths, and power levels (e.g., amplitude) to transmit their respective signals ($T_1$, $T_2$) for example, the signal 2122 and the signal 2124. Thus, the ground station 2106 may receive the signal 2122 and the signal 2124 having a significant or complete frequency overlap between the received signals. In some embodiments, there may be more than two overlapped signals. The overlap of two or more signals of interest may present the ground station 2106 with certain problems requiring separation and parsing of overlapped and possibly interfering signals, for example the signal 2122, and the signal 2124.

Modulation as described herein may include, but not be limited to analog or digital modulation. Some of the modulation schemes referenced herein can include but not be limited to quadrature amplitude modulation (QAM), phase shift keying (PSK), binary PSK (BPSK), quadrature PSK (QPSK), differential PSK (DPSK), differential QPSK (DQPSK), amplitude and phase shift keying (APSK), offset QPSK (OQPSK), amplitude shift keying (ASK), minimum-shift keying (MSK), Gaussian MSK (GMSK) among other types of modulation, time division multiple access (TDMA), code division multiple access (CDMA), orthogonal frequency division multiple access (OFDMA), and continuous phase modulation (CPM). Certain modulation types such as for example QAM and APSK may also differ in modulus, for example, 4QAM, 8QAM, and 16APSK, to name a few.

Satellite Communication Device

Figure 14:
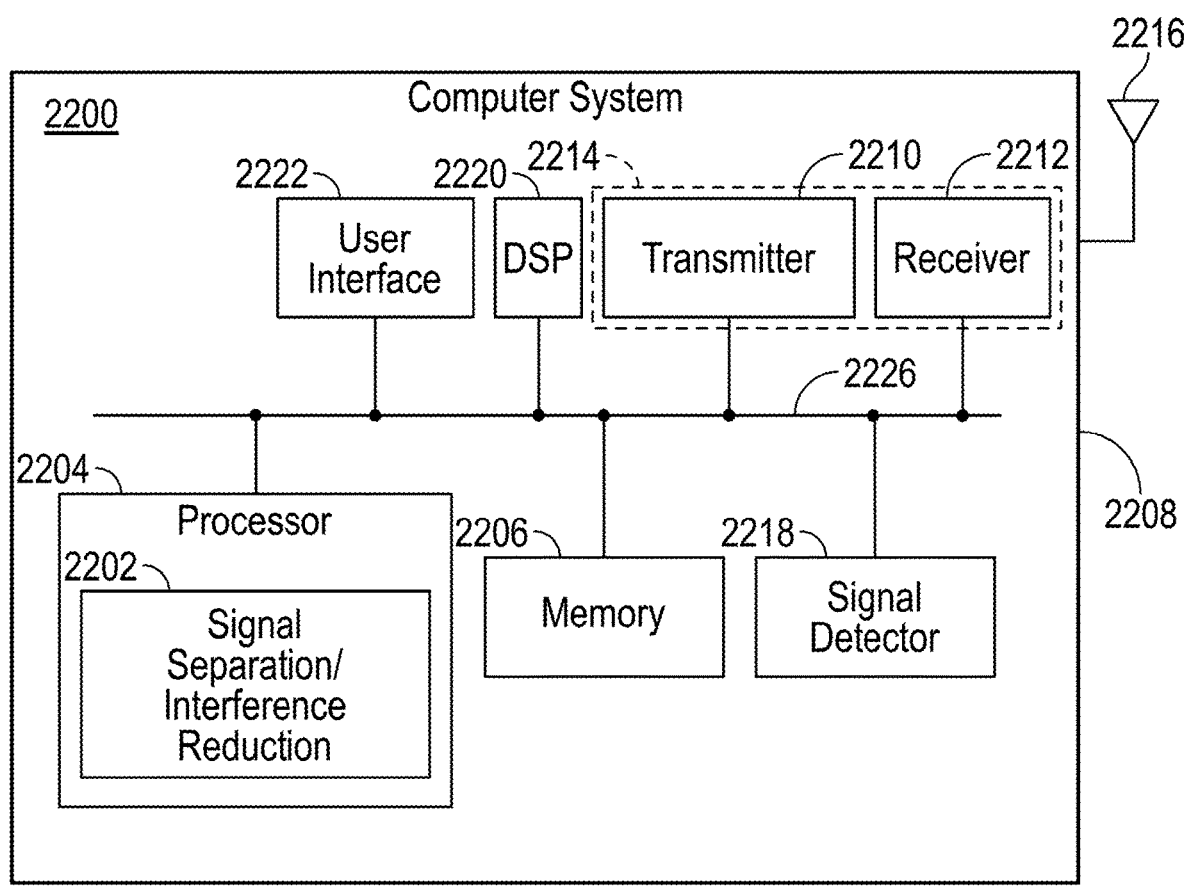
FIG. 14 is a functional block diagram of components of a communication device that may be employed within the communication system of FIG. 13.

FIG. 14 is a functional block diagram of components of a communication device that may be employed within the communication system of FIG. 13 and that may be used in connection with various embodiments described herein. As shown, communication device 2200 may be implemented as the ground stations of FIG. 13, which as discussed above with respect to FIG. 13, may be implemented as the emergency station 100. The emergency station 100 including the communication device 2200 may be remotely triggered and/or controlled (e.g., remotely) by authorized users through satellite signals and/or enable continuous monitoring of satellite signals to perform automatic functions and/or modify protocols and responses using machine learning, AI and IOT, which may be in combination with optional outboard sensors and remote user input.

The communication device ("device") 2200 may include one or more of the features of the system 600 described above with respect to FIG. 6, which is incorporated herein, and includes a processor 2204 which controls operation of the communication device 2200. The processor 2204 may also be referred to as a central processing unit (CPU). The communication device 2200 may further include a memory 2206 operably connected to the processor 2204, which may include both read-only memory (ROM) and random access memory (RAM), providing instructions and data to the processor 2204. A portion of the memory 2206 may also include non-volatile random access memory (NVRAM). The processor 2204 typically performs logical and arithmetic operations based on program instructions stored within the memory 2206. The instructions in the memory 2206 may be executable to implement the methods described herein.

When the communication device 2200 is implemented or used as a receiving node or ground station, the processor 2204 may be configured to process information from of a plurality of different signal types. In such an embodiment, the communication device 2200 may be implemented as the ground station 2106 and configured to receive and parse or separate the composite signal 2136 into its constituent signals (e.g., the signal 2122 and the signal 2124). For example, the processor 2204 may be configured to determine the frequency, bandwidth, modulation type, shaping factor, and symbol trajectory, among other transmission characteristics in order to recreate or regenerate the signals 2122, 2124. The processor 2204 may implement various processes or methods in certain signal separation and interference reduction modules ("modules") 2202 to effect such determinations.

The processor 2204 may further include one or more adaptive equalizers (not shown). The adaptive equalizers may be configured to estimate and characterize incoming signals in the time domain.

The processor 2204 may comprise or be a component of a processing system implemented with one or more processors 2204. The one or more processors 2204 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processor 2204 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors 2204, cause the processing system to perform the various functions described herein.

The communication device 2200 may also include a housing 2208 that may include a transmitter 2210 and a receiver 2212 to allow transmission and reception of data between the communication device 2200 and a remote location. For example, such communications may occur between the ground stations 2102, 2104, 2106. The transmitter 2210 and receiver 2212 may be combined into a transceiver 2214. An antenna 2216 may be attached to the housing 2208 and electrically coupled to the transceiver 2214, or to the transmitter 2210 and the receiver 2212 independently. The communication device 2200 may also include (not shown) multiple transmitters, multiple receivers, multiple transceivers, and/or multiple antennas.

The communication device 2200 may also include a signal detector 2218 that may be used in an effort to detect and quantify the level of signals received by the transceiver 2214. The signal detector 2218 may detect such signals as frequency, bandwidth, symbol rate, total energy, energy per symbol, power spectral density and other signal characteristics. The signal detector 2218 may also include a "windowing module" and may further be configured to process and incoming data (e.g., one or more signals 2122, 2124) ensuring that the processor 2204 is receiving a correct bandwidth-limited portion of a wireless communication spectrum in use. As a non-limiting example, certain transmissions to and from a ground station 2102, 2104 can incur certain time and frequency variations by the time the transmissions are received at the satellite 2110 and rerouted to the ground station 2106. Such variations may be due to Doppler shift and distance traveled, among other factors. Accordingly, the signal detector 2218 (or windowing module) may correct the incoming signal(s) 2136 for bandwidth and center frequency to ensure the processor 2204 received the correct portion of the spectrum including the signal(s) 2122, 2124, 2136.

The communication device 2200 may also include a digital signal processor (DSP) 2220 for use in processing signals. The DSP 2220 may be configured to generate a data unit for transmission. The DSP 2220 may further cooperate with the signal detector 2218 and the processor 2204 to determine certain characteristics of the composite signal 2136.

The communication device 2200 may further comprise a user interface 2222 in some aspects. The user interface 2222 may comprise a keypad, a microphone, a speaker, and/or a display. The user interface 2222 may include any element or component that conveys information to a user of the communication device 2200 and/or receives input from the user.

The various components of the communication device 2200 described herein may be coupled together by a bus system 2226. The bus system 2226 may include a data bus, for example, as well as a power bus, a control signal bus, and a status signal bus in addition to the data bus. Those of skill in the art will appreciate the components of the communication device 2200 may be coupled together or accept or provide inputs to each other using some other mechanism.

Although a number of separate components are illustrated in FIG. 14, one or more of the components may be combined or commonly implemented. For example, the processor 2204 may be used to implement not only the functionality described above with respect to the processor 2204, but also to implement the functionality described above with respect to the signal detector 2218 and/or the DSP 2220. Further, each of the components illustrated in FIG. 14 may be implemented using a plurality of separate elements. Furthermore, the processor 2204 may be used to implement any of the components, modules, circuits, or the like described below, or each may be implemented using a plurality of separate elements.

With reference to FIGS. 13 and 14, an emergency station control or emergency control 2300 including one or more of the aforementioned features is used to mitigate power outage occurrences. The emergency station control 2300 provides for remote wireless monitoring and selective activation for existing products (e.g., stand-alone rechargeable batteries 2360, 2370, 2380) and/or electric power generating substations. The emergency station control or emergency control 2300 is one or more of a) part of an emergency station (e.g., user control, interface, and monitoring system 2310 is integrated into an emergency power station/substation) b) an add-on product that monitors and activate such stations/substations (e.g., stand-alone rechargeable batteries, electric power generating substations), and c) control electronics/circuitry that is at least one of incorporated/integrated into an add-on product/controller and incorporated/integrated into an emergency power station/substation to monitor and activate emergency power station(s)/substation(s).

Figure 15:
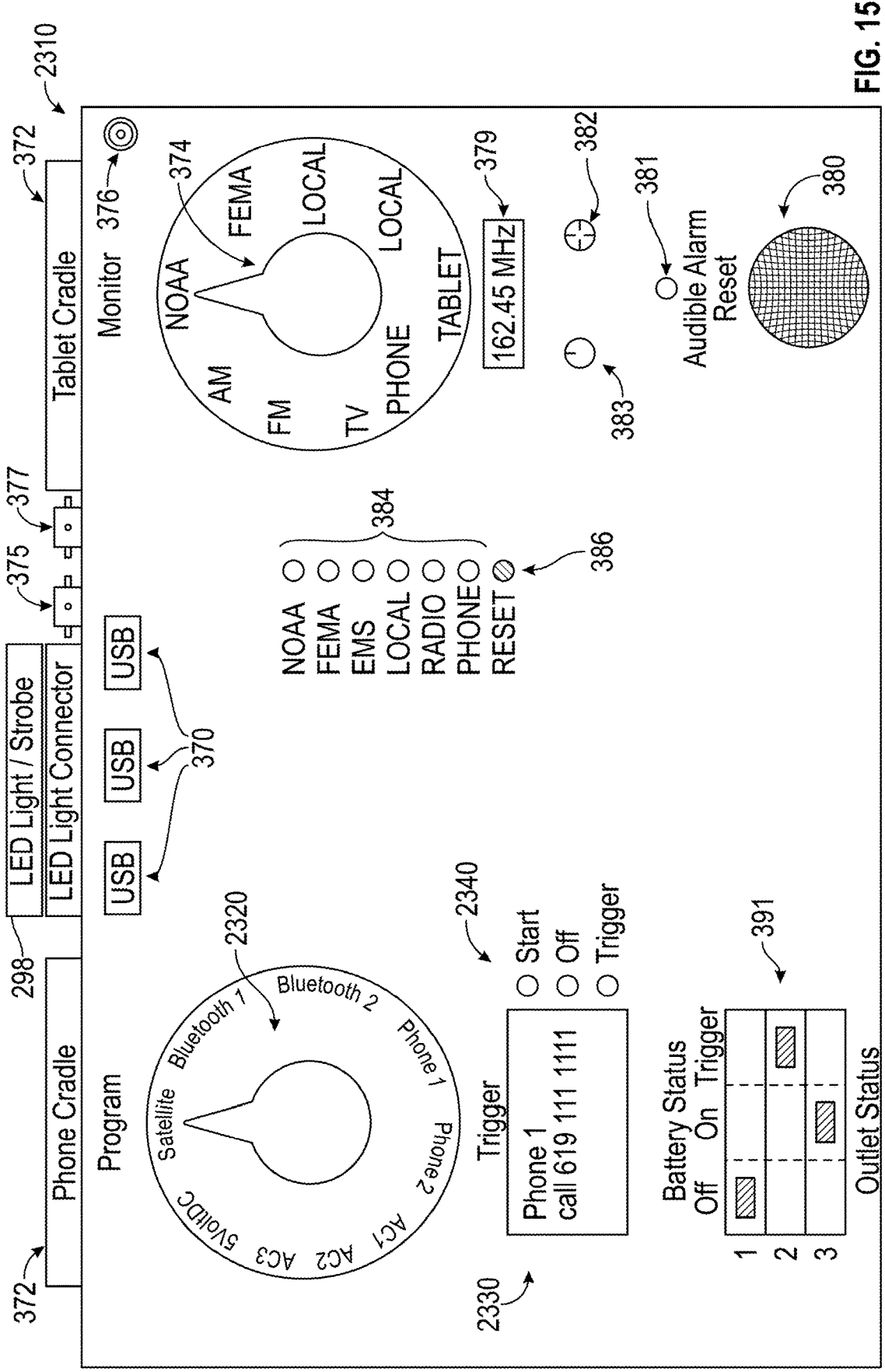
FIG. 15 is a diagram of another embodiment of a user control, interface and monitoring system for an emergency station.

FIG. 15 shows an embodiment of a user control, interface, and monitoring system 2310 of the emergency station control 2300. Like elements to those shown and/or described herein with respect to user control, interface, and monitoring system 2310 and FIG. 4 are shown with like reference numbers, and the description is incorporated herein. In the embodiment of the system 2310, because there is no pump, instead of adjusting pump motor power and by means of selectable user adjustable input via a rotating switch 314 as with the system 350 of FIG. 4, the system 2310 includes a rotating switch 2320 to select different power outputs (e.g., AC1, AC2, AC3, 5VoltDC) or different communication modes (e.g., Satellite, Bluetooth 1, Bluetooth 2, Phone 1, Phone 2). Further, instead of indicator(s) 390 and display 368 of FIG. 4, the system 2310 of FIG. 15 includes a display 2330 that displays the selected communication mode and other information (e.g., call information) as well as a status indicators 2340 (e.g., Start, Off, Trigger). With reference additionally to FIG. 3B, the emergency station control 2300 includes a transceiver 373 (e.g., for two-way command of radio, WIFI, Bluetooth), receiving antenna/connector 375, and/or transmitting antenna/connector 377. The aforementioned system 600 for interface/system 2310 has a power management system that when the charge of one of the batteries (e.g., battery 2360) draws to a close (i.e., charge approaches minimum charge level), the system 600 senses that there is another battery (e.g., second battery 2370, third battery 2380, etc.) and power is supplied from such battery.

Figure 16:
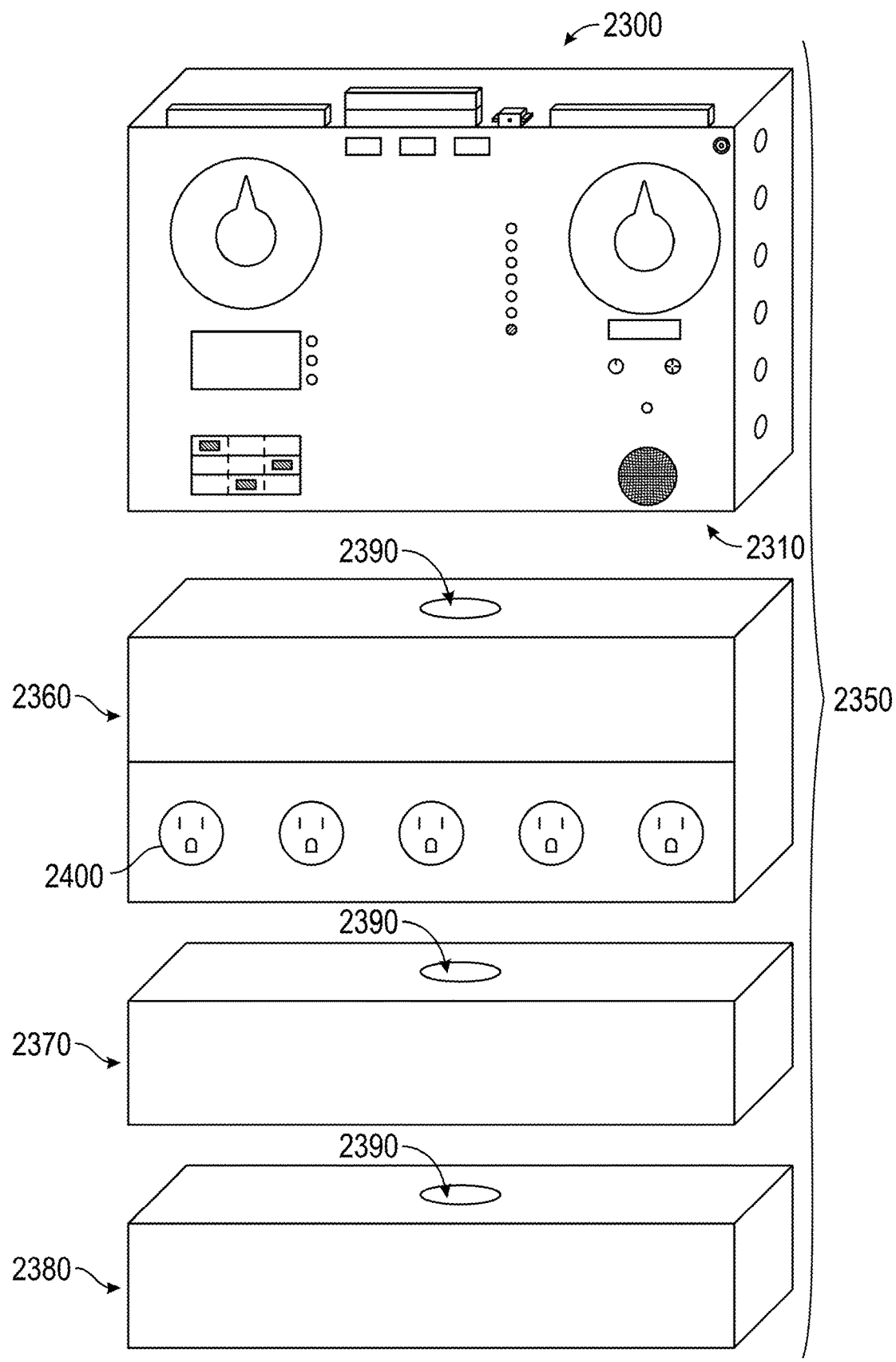
FIG. 16 is a perspective view of another embodiment of an emergency station including an emergency station control with the user control, interface and monitoring system of FIG. 15 shown electrically coupled to a plurality of stacked batteries.

FIG. 16 shows an embodiment of an emergency station 2350 comprised of the emergency station control 2300 electrically coupled to one or more batteries (e.g., stackable stand-alone rechargeable batteries) 2360, 2370, 2380 via connector(s) 2390. Battery 2360 is shown with AC outlets 2400.

Figure 17:
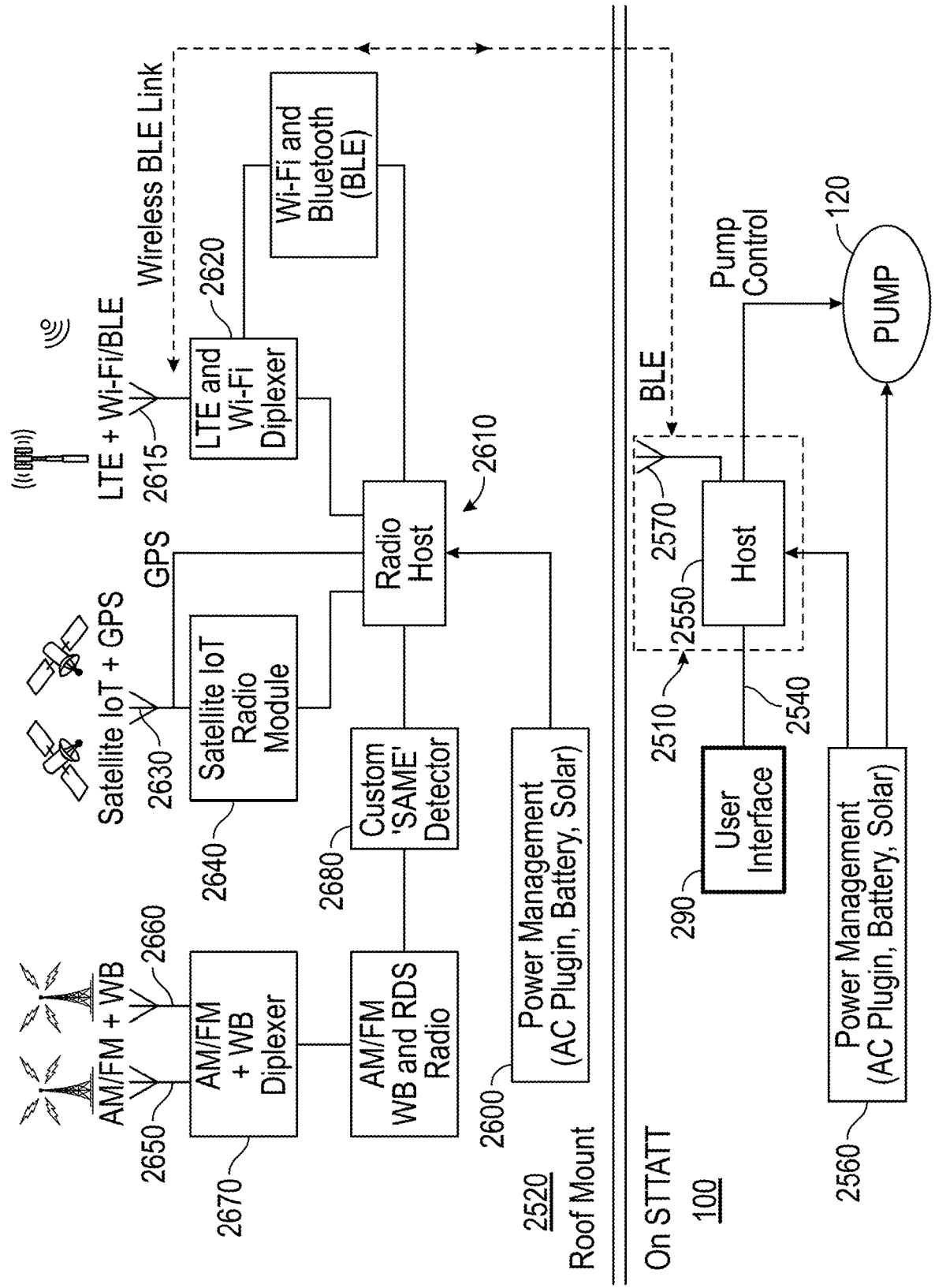
FIG. 17 is a functional block diagram of components of an embodiment of a remote wireless communication unit for an emergency station.
Figure 18:
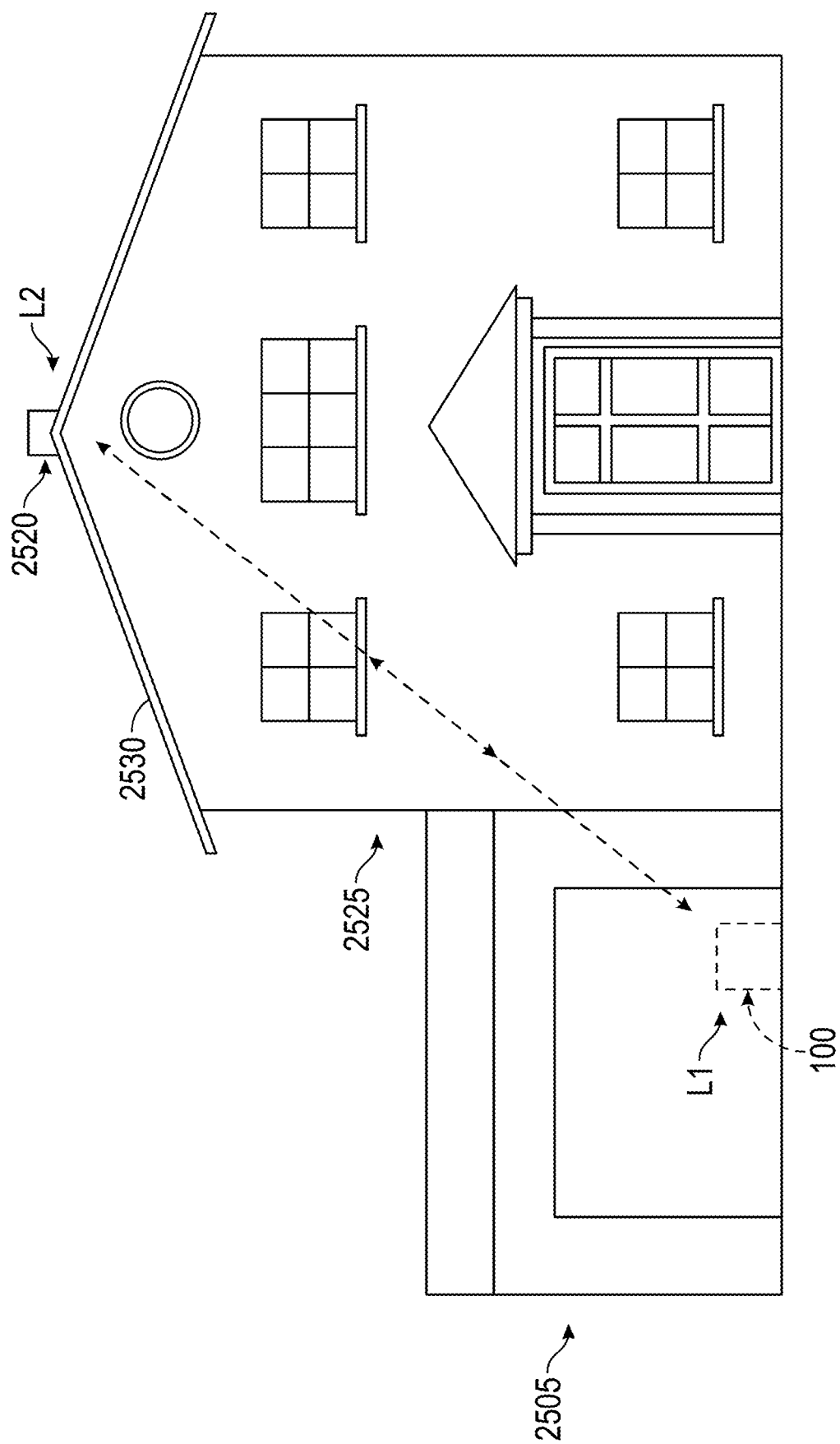
FIG. 18 is a front elevational view of a building structure (e.g., house) and shows an embodiment of an emergency station located inside a garage at a location L1 in wireless communication with an embodiment of a remote wireless communication unit located outside the house, on a rooftop, at a location L2.
Figure 19:
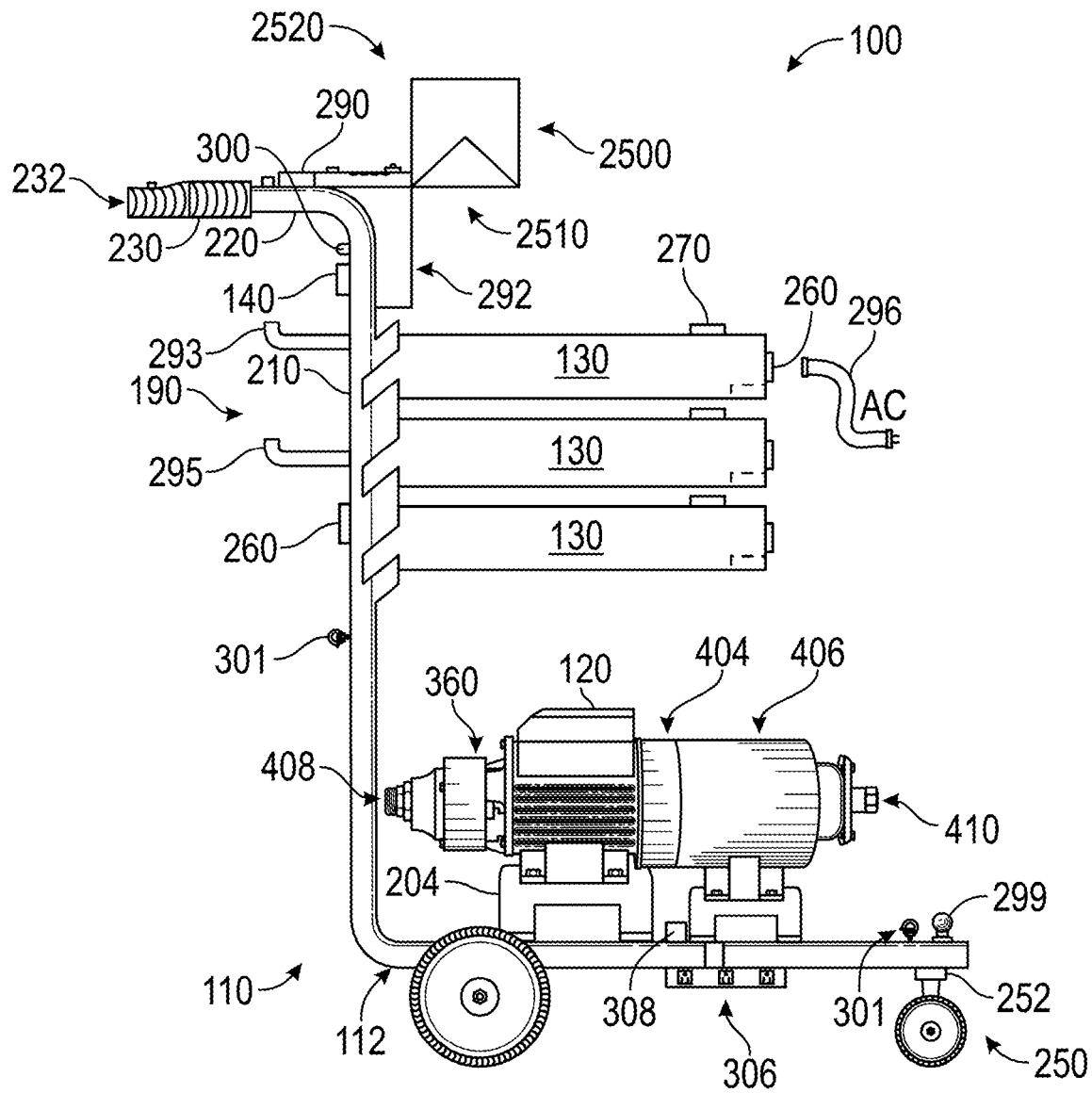
FIG. 19 is a side elevational view of an embodiment of an integrated, portable emergency station including a wireless communication system having a base unit and a remote wireless communication unit.

FIGS. 17-19 shows an embodiment of a wireless communication system 2500 for the emergency station 100 for use when the emergency station 100 is housed indoors (e.g., a garage, shed, utility building/structure 2505) and/or in a non-ideal wireless communication reception area (e.g., non-ideal RF/Satellite reception area), at Location L1. The wireless communication system 2500 may be used with any of the emergency station embodiments shown and/or described herein, which are incorporated herein. The example processing system shown and/or described with respect to FIG. 7 is also incorporated herein with respect to wireless communication system 2500.

The wireless communication system 2500 includes a base unit 2510 supported by the emergency station chassis and housing 110 and a remote wireless communication unit or remote unit 2520 that may be located outside on a rooftop 2530 (or other location to improve wireless reception), at a Location L2, of a house, building, shed, structure 2525. The base unit 2510 is connected to the communications system/user control and display panel ("user interface") 290 through a hardware connector 2540. The base unit 2510 includes a host 2550 with one or more processors 320 to perform the functions described herein such as, but not limited to, controlling electric pump/compressor/pressurizer 120 and processing the wireless signals as described herein. The base unit 2510 is powered by a power management system 2560, which may include being powered by a wired connection (e.g., power cord and plug for AC plugin), one or more onboard interchangeable, removable, hot-swappable rechargeable batteries 130, and/or one or more solar arrays 302. In an embodiment of the base unit 2510, the base unit 2510 includes one or more antennas 2570 of a single radio type (e.g., Wi-Fi, Bluetooth (BLE)) for the purpose of communicating with the remote unit 2510. In alternative embodiments, base unit 2510 and the remote unit 2510 communicate with each other through multiple wireless communication types. Communication may be, but is not limited to, collecting data received on any of multiple remote radios of the remote unit 2510, send commands to initiate certain activities at the remote unit 2510, and/or preform any of the functions described with respect to the systems and methods shown and described herein.

The remote unit 2520 may be detachably connected to the base unit 2510 and/or the emergency station 100. Alternatively, the remote unit 2520 is a completely separate stand-alone device and not detachably connected to the base unit 2510 and/or the emergency station 100. The remote unit 2520 is powered by a power management system 2600, which may include being powered by a wired connection (e.g., power cord and plug for AC plugin), one or more onboard interchangeable, removable, hot-swappable rechargeable batteries 130, and/or one or more solar arrays 302. The remote unit 2520 includes a radio host 2610 including one or more processors 320 to perform the functions described herein, one or more LTE, WIFI, and/or Bluetooth (BLE) antennas 2615 that wirelessly communicate (e.g., through wireless and/or BLE links) to the base unit 2510, and a LTE and/or WIFI diplexer 2620. The remote unit 2520 may include one or more Satellite IoT and/or GPS antennas 2630, and a satellite IoT radio module 2640 in communication with the radio host 2610. The remote unit 2520 may include one or more AM/FM antennas 2650, a wideband (WB) antenna 2660, an AM/FM and WB diplexer 2670, and a customer "SAME" detector 2680 in communication with the radio host 2610.

If the emergency station 100 is housed indoors or in a non-ideal RF/Satellite reception location L1, the remote unit 2520 may be detached from the base unit 2510 and/or the emergency station 100 placed outside on the rooftop 2530, at the location L2. The remote unit 2520 is battery powered with a solar option for charging and recharging. The remote unit 2520 communicates wirelessly with the base unit 2510 on the main chassis and/or the emergency station 100. Separating the base unit 2510/emergency station 100 and remote unit 2520 allows for optimal antenna placement (integrated in the remote unit 2520), which allows the emergency station 100 to be placed in the most optimal location for its intended purpose.

With reference to FIG. 19, with its improved reception outdoors and on the rooftop 2530, the remote unit 2520 may receive incoming signals representative of emergency alert communication signals from one or more of FEMA, NOAA, fire services, police services, military services, local emergency services, an emergency agency, a television station, and a radio station (or other types of wireless communication signal), and wirelessly transmit (e.g., via Bluetooth, WIFI) those signals to the emergency station 100 for processing, as shown, described, and incorporated herein. In such an embodiment, the remote unit 2520 and the emergency station 100 may combine to form an integrated, portable, battery-powered, variable-pressure electric liquid pump and power emergency station, comprising a chassis 110; one or more wheels 114 supporting the chassis 110; an electrically powered, variable-pressure liquid pump 120 carried by the chassis 110; one or more rechargeable batteries 130 powering the variable-pressure liquid pump 120 to transfer liquid at variable pressures from a liquid source to a liquid destination; one or more AC outlets 306 carried by the chassis 110 and powered by the one or more rechargeable batteries 130 to provide emergency back-up power during power outage; a remote wireless communication unit 2520, which may be located remotely from and in wireless communication with the emergency station 100 as shown in FIG. 18, the remote wireless communication unit 2520 including at least one hardware processor 610 (FIG. 7); and one or more software modules that, when executed by the at least one hardware processor 610, wirelessly receive incoming signals representative of emergency alert communication signals from one or more of FEMA, NOAA, fire services, police services, military services, local emergency services, an emergency agency, a television station, and a radio station; wirelessly transmit the signals representative of emergency alert communication signals to the emergency station 100; wherein the emergency station 100 includes at least one hardware processor 610; and one or more software modules that, when executed by the at least one hardware processor, wirelessly receive the signals representative of emergency alert communication signals from the remote wireless communication unit 2520; determine if the received incoming signals meet predetermined criteria indicative of an emergency; cause actuation of one or more of onboard electrical equipment and ancillary electrical equipment upon determination that the received incoming signals meet the predetermined criteria. The one or more of onboard electrical equipment and ancillary electrical equipment includes one or more of causing the one or more rechargeable batteries 130 to be fully charged, activation of the variable-pressure liquid pump 120 at user predetermined rates, and power the one or more AC outlets 306. In a further embodiment, the emergency station 100 may not include the variable-pressure electric liquid pump 120.

An exemplary method of using the remote unit 2520 comprises wirelessly receiving incoming signals representative of emergency alert communication signals from one or more of FEMA, NOAA, fire services, police services, military services, local emergency services, an emergency agency, a television station, and a radio station; wirelessly transmitting the signals representative of emergency alert communication signals to the emergency station 100, where it is determined if the received incoming signals meet predetermined criteria indicative of an emergency and cause actuation of one or more of onboard electrical equipment and ancillary electrical equipment upon determination that the received incoming signals meet the predetermined criteria.

An exemplary method of using the emergency station 100 with the remote unit 2520 comprises wirelessly receiving the incoming signals representative of emergency alert communication signals from one or more of FEMA, NOAA, fire services, police services, military services, local emergency services, an emergency agency, a television station, and a radio station from the remote unit 2520; determining if the received incoming signals meet predetermined criteria indicative of an emergency; and causing actuation of one or more of onboard electrical equipment and ancillary electrical equipment upon determination that the received incoming signals meet the predetermined criteria.

Alternatively, with its better reception, the remote unit 2520 may receive and process incoming signals representative of emergency alert communication signals from one or more of FEMA, NOAA, fire services, police services, military services, local emergency services, an emergency agency, a television station, and a radio station, and wireless transmit (e.g., via Bluetooth, WIFI) actuation signals to the emergency station 100 and send actuation signals to the emergency station 100 to cause actuation of one or more of onboard electrical equipment and ancillary electrical equipment upon determination by the remote unit 2520 that the received incoming signals meet predetermined criteria. In such an embodiment, the remote unit 2520 and the emergency station 100 may combine to form an integrated, portable, battery-powered, variable-pressure electric liquid pump and power emergency station 100, comprising a chassis; one or more wheels supporting the chassis 110; an electrically powered, variable-pressure liquid pump 120 carried by the chassis 110; one or more rechargeable batteries 130 powering the variable-pressure liquid pump to transfer liquid at variable pressures from a liquid source to a liquid destination; one or more AC outlets 306 carried by the chassis 110 and powered by the one or more rechargeable batteries 130 to provide emergency back-up power during power outage; a remote wireless communication unit 2520 located remotely from and in wireless communication with the emergency station 100; wherein the remote wireless communication unit 2520 includes at least one hardware processor 610; and one or more software modules that, when executed by the at least one hardware processor 610, wirelessly receive at the remote wireless communication unit 2520 incoming signals representative of emergency alert communication signals from one or more of FEMA, NOAA, fire services, police services, military services, local emergency services, an emergency agency, a television station, and a radio station; determine if the received incoming signals meet predetermined criteria indicative of an emergency; wirelessly transmit actuation signals from the remote wireless communication unit to the emergency station 100, causing actuation of one or more of onboard electrical equipment and ancillary electrical equipment upon determination that the received incoming signals meet the predetermined criteria. The one or more of onboard electrical equipment and ancillary electrical equipment includes one or more of causing the one or more rechargeable batteries 130 to be fully charged, activation of the variable-pressure liquid pump 120 at user predetermined rates, and power the one or more AC outlets 306. In a further embodiment, the emergency station 100 may not include the variable-pressure electric liquid pump 120.

An exemplary method of using the remote unit 2520 comprises wirelessly receiving at the remote unit 2520 incoming signals representative of emergency alert communication signals from one or more of FEMA, NOAA, fire services, police services, military services, local emergency services, an emergency agency, a television station, and a radio station; determining if the received incoming signals meet predetermined criteria indicative of an emergency; and wirelessly transmit actuation signals from the remote wireless communication unit 2520 to the emergency station 100, causing actuation of one or more of onboard electrical equipment and ancillary electrical equipment upon determination that the received incoming signals meet the predetermined criteria.

While various embodiments of the present invention have been described above, it should be understood that they have been presented by way of example only, and not of limitation. Likewise, the various diagrams may depict an example architectural or other configuration for the disclosure, which is done to aid in understanding the features and functionality that can be included in the disclosure. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

I claim:

1. An integrated, portable, battery-powered, variable-pressure electric liquid pump and power emergency station, comprising:
   a chassis;
   one or more wheels supporting the chassis;
   an electrically powered, variable-pressure liquid pump carried by the chassis;
   one or more rechargeable batteries powering the variable-pressure liquid pump to transfer liquid at variable pressures from a liquid source to a liquid destination;
   one or more AC outlets carried by the chassis and powered by the one or more rechargeable batteries to provide emergency back-up power during power outage;
   a remote wireless communication unit located remotely from and in wireless communication with the emergency station, the remote wireless communication unit including a processor that when executing one or more software modules, is configured to
   wirelessly receive incoming signals representative of emergency alert communication signals from one or more of FEMA, NOAA, fire services, police services, military services, local emergency services, an emergency agency, a television station, and a radio station;
wirelessly transmit the signals representative of emergency alert communication signals to the emergency station;
wherein the emergency station includes a processor that when executing one or more software modules, is configured to
wirelessly receive the signals representative of emergency alert communication signals from the remote wireless communication unit;
determine if the received incoming signals meet predetermined criteria indicative of an emergency;
cause actuation of one or more of onboard electrical equipment and ancillary electrical equipment upon determination that the received incoming signals meet the predetermined criteria.

2. The integrated, portable, battery-powered, variable-pressure electric liquid pump and power emergency station of claim 1, wherein the one or more of onboard electrical equipment and ancillary electrical equipment includes one or more of causing the one or more rechargeable batteries to be fully charged, activation of the variable-pressure liquid pump at user predetermined rates, and power the one or more AC outlets.

3. The integrated, portable, battery-powered, variable-pressure electric liquid pump and power emergency station of claim 1, wherein the integrated, portable, battery-powered, variable-pressure electric liquid pump and power emergency station is located indoors and the remote wireless communication unit is located outdoors.

4. The integrated, portable, battery-powered, variable-pressure electric liquid pump and power emergency station of claim 3, wherein the remote wireless communication unit is located on a rooftop.

5. An integrated, portable, battery-powered, variable-pressure electric liquid pump and power emergency station, comprising:
a chassis;
one or more wheels supporting the chassis;
an electrically powered, variable-pressure liquid pump carried by the chassis;
one or more rechargeable batteries powering the variable-pressure liquid pump to transfer liquid at variable pressures from a liquid source to a liquid destination;
one or more AC outlets carried by the chassis and powered by the one or more rechargeable batteries to provide emergency back-up power during power outage;
a remote wireless communication unit located remotely from and in wireless communication with the emergency station;
wherein the remote wireless communication unit includes a processor that when executing one or more software modules, is configured to
wirelessly receive at the remote wireless communication unit incoming signals representative of emergency alert communication signals from one or more of FEMA, NOAA, fire services, police services, military services, local emergency services, an emergency agency, a television station, and a radio station;
determine if the received incoming signals meet predetermined criteria indicative of an emergency;
wirelessly transmit actuation signals from the remote wireless communication unit to the emergency station, causing actuation of one or more of onboard electrical equipment and ancillary electrical equipment upon determination that the received incoming signals meet the predetermined criteria.

6. The integrated, portable, battery-powered, variable-pressure electric liquid pump and power emergency station of claim 5, wherein the one or more of onboard electrical equipment and ancillary electrical equipment includes one or more of causing the one or more rechargeable batteries to be fully charged, activation of the variable-pressure liquid pump at user predetermined rates, and power the one or more AC outlets.

7. The integrated, portable, battery-powered, variable-pressure electric liquid pump and power emergency station of claim 5, wherein the integrated, portable, battery-powered, variable-pressure electric liquid pump and power emergency station is located indoors and the remote wireless communication unit is located outdoors.

8. The integrated, portable, battery-powered, variable-pressure electric liquid pump and power emergency station of claim 7, wherein the remote wireless communication unit is located on a rooftop.

* * * * *